US012332106B1

(12) United States Patent
Meyer

(10) Patent No.: US 12,332,106 B1
(45) Date of Patent: Jun. 17, 2025

(54) WELLBORE WATER LEVEL AND HEALTH DETERMINATION SYSTEM AND METHOD(S)

(71) Applicant: IMBRR, LLC, Golden, CO (US)

(72) Inventor: Philip James Meyer, Golden, CO (US)

(73) Assignee: IMBRR, LLC, Golden, CO (US)

( * ) Notice: Subject to any disclaimer, the term of this patent is extended or adjusted under 35 U.S.C. 154(b) by 0 days.

(21) Appl. No.: 18/898,183

(22) Filed: Sep. 26, 2024

(51) Int. Cl.
*G01F 23/80* (2022.01)
*E03B 5/04* (2006.01)
*G01F 25/20* (2022.01)

(52) U.S. Cl.
CPC ............ *G01F 23/804* (2022.01); *E03B 5/04* (2013.01); *G01F 25/20* (2022.01)

(58) Field of Classification Search
CPC ........ G01F 25/20; G01F 22/00; G01F 23/266; G01F 17/00; G01F 22/02; G01F 23/38; G01F 23/268; G01F 23/263; G01F 23/261; G01F 15/0755; G01F 23/14; G01F 23/804; B01D 37/045; E03B 5/04
USPC ................. 73/1.73, 290 R, 291; 166/250.03
See application file for complete search history.

(56) References Cited

U.S. PATENT DOCUMENTS

| | | | |
|---|---|---|---|
| 10,429,830 B2 | 10/2019 | Lunani et al. | |
| 10,513,446 B2 | 12/2019 | Vuong | |
| 10,591,389 B2 | 3/2020 | Trumbo et al. | |
| 10,816,430 B1 | 10/2020 | Jerphagnon et al. | |
| 10,948,882 B2 | 3/2021 | Acosta Gonzalez | |
| 2018/0003180 A1 | 1/2018 | Raghavachari | |
| 2018/0291911 A1 | 10/2018 | Ward et al. | |
| 2021/0333033 A1* | 10/2021 | Pareto | E03B 7/12 |
| 2024/0074368 A1 | 3/2024 | Benassi | |
| 2024/0402659 A1* | 12/2024 | Bin Adnan | G05B 13/0265 |

FOREIGN PATENT DOCUMENTS

| | | |
|---|---|---|
| AU | 2021103425 A4 | 5/2022 |
| CA | 2230691 A1 | 3/1997 |
| CN | 201203456 Y | 3/2009 |
| CN | 105300443 A | 2/2016 |
| CN | 106015028 B | 10/2016 |
| CN | 208998889 U | 6/2019 |
| CN | 111985610 A | 11/2020 |
| CN | 111998912 A | 11/2020 |
| JP | S63176517 A | 7/1988 |

(Continued)

OTHER PUBLICATIONS

Gaffoor, Z. et al. (Oct. 9, 2020). Big Data Analytics and Its Role to Support Groundwater Management in the Southern African Development Community. Water. 12. 2796. 10.3390/w12102796. 28 pages.

(Continued)

*Primary Examiner* — John E Breene
*Assistant Examiner* — Truong D Phan
(74) *Attorney, Agent, or Firm* — Stephen B. Katsaros; Patent Engineering, LLC

(57) ABSTRACT

The present disclosure relates to systems and methods for determining the water level and health of a wellbore. The system may be configured to perform a wellbore water level determination method and a wellbore health determination method to determine the water level in a wellbore (and/or the health of the wellbore) using a set of real-time parameters and pump-characteristics data.

16 Claims, 12 Drawing Sheets

(56) References Cited

FOREIGN PATENT DOCUMENTS

| JP | H0396675 A | 4/1991 |
|---|---|---|
| JP | 2012207546 A | 10/2012 |
| KR | 100955599 B1 | 5/2010 |
| WO | 2014005099 A1 | 1/2014 |

OTHER PUBLICATIONS

Green, S. (Dec. 20, 2019). Pump it up: predict water pump condition using data science. Medium. https://towardsdatascience.com/pump-it-up-predict-water-pump-condition-using-data-science-2839d26638b8. 18 pages.

Inter-American Development Bank (2011). Evaluation of Water Pumping Systems. Energy Efficient Assessment Manual 1st Edition. 96 pages.

Martin-Candilejo, Araceli et al (Dec. 31, 2019). Pump Efficiency Analysis for Proper Energy Assessment in Optimization of Water Supply Systems. Water 2020, 12(1), 132; https://doi.org/10.3390/w12010132. Water Resources Management Models for Policy Assessment. 18 pages.

* cited by examiner

WELLBORE WATER LEVEL AND HEALTH DETERMINATION SYSTEM AND METHOD(S)

TECHNICAL FIELD

This disclosure pertains generally to the field of wellbore management. More particularly, this disclosure relates to systems and methods for determining the water level, and health of the wellbore.

BACKGROUND

Measuring the depth of water level in a wellbore by well contractors and engineers plays a pivotal role in recording groundwater levels. Traditional methods, such as manual measurement using steel or electronic tape, are invasive, require manual measurement, and get stuck in the well during the measurement process. The traditional methods may further include a bubbler system or an air-purge system requiring compressed air through the wellbore to measure the water level. In addition, the traditional methods also use sensor-based detections with sensors such as ultrasonic depth sensors. These methods require high energy to operate, are expensive, and require regular maintenance to ensure proper operation. In case of the sensor-based detection, inaccurate measurements of water level may be detected due to anomaly in detections caused by perforations in the casing. Moreover, the determination of the health of the wellbore may also be inaccurate because traditional methods for measuring the depth of water may be unreliable.

SUMMARY

To this end, systems and methods of determination of wellbore water level and wellbore health are disclosed. The wellbore water level determination system may be configured to perform a wellbore water level determination method and a wellbore health determination method for determining the water level and health of a wellbore system. The methods and systems to determine the characteristics are explained in detail in successive configurations of this disclosure.

In an illustrative configuration, a water level determination method for determining a water level in a wellbore is disclosed. In the first step, a pumping unit may be provided. In the next step, a fluid connection line may be provided. The fluid connection line may include an inlet fluidically coupling to the pumping unit, an outlet fluidically coupling to a pressure tank, and an intermediate line may be disposing between the inlet and the outlet. Further, in the next step, a flow control valve may be provided, and the flow control valve may be disposed in the fluid connection line. In the next step, a sensor unit may be provided in the intermediate line. In the next step, a sensor data of water flowing across the intermediate line may be sensed with the sensor unit, and the sensor data may include pressure, flow rate, and temperature of the flowing water. Further, in the next step, the sensor data may be transmitted to at least one server. In the next step, a set of real-time parameters may be determined with the sensor data. In the next step, the set of real-time parameters may be analyzed with a characteristic data of the pumping unit, and the characteristic data may be stored in the server. Further, in the next step, a water level parameter may be determined by analyzing the set of real-time parameters with the characteristic data of the pumping unit. In the next step, the water level may be determined with the water level parameter.

In an illustrative configuration, a water level determination system to determine a water level in a wellbore is disclosed. The water level determination system may include a pumping unit. The water level determination system may include a fluid connection line. The fluid connection line may further include an inlet that is fluidically coupled to the pumping unit, an outlet that is fluidically coupled to a pressure tank, and an intermediate line that is disposed between the inlet and the outlet. Further, the water level determination system may include a flow control valve, and the flow control valve may be disposed in the fluid connection line. Further, a sensor unit may be disposed in the intermediate line. The sensor unit may be configured to sense a sensor data of a water flowing across the intermediate line, the sensor data may include a pressure, a flow, and a temperature of a flowing water. Further, the water level determination system may include a computing unit. The computing unit may be communicably coupled to at least one server to determine a set of real-time parameters with the sensor data. The computing unit may transmit the set of real-time parameters to a server. Further, the computing unit may analyze the set of real-time parameters with a characteristic data of the pumping unit, the characteristic data may be stored in the server. The computing unit may determine a water level parameter by analyzing the characteristic data and the set of real-time parameters. Further, the computing unit may determine the water level with the water level parameter.

In an illustrative configuration, a wellbore system health determination method for determining the health of a wellbore system is disclosed. In the first step, a pumping unit may be provided. In the next step, a fluid connection line may be provided, the fluid connection line may include an inlet fluidically coupled to the pumping unit, an outlet fluidically connected to a pressure tank, and an intermediate line may be disposed between the inlet and the outlet. Further, in the next step, a flow control valve may be provided. The flow control valve may be disposed in the fluid connection line. In the next step, a sensor unit may be provided in the intermediate line. In the next step, a sensor data of a water flowing across the intermediate line may be sensed with the sensor unit, the sensor data may include a pressure, a flow rate, and the temperature of the flowing water. Further, in the next step, the sensor data may be transmitted to at least one server. In the next step, a set of real-time parameters may be determined with the sensor data. In the next step, the set of real-time parameters may be analyzed with a characteristic data of the pumping unit, and the characteristic data may be stored in the server. Further, in the next step, at least one wellbore parameter may be determined by analyzing the set of real-time parameters with the characteristic data of the pumping unit. In the next step, a set of rules may be established against at least one wellbore parameter. Furthermore, in the next step, a deteriorating health of the wellbore may be determined with a breach in the set of rules.

In an illustrative configuration, a user interface of an edge device for displaying a water level in a wellbore is disclosed. The user interface may include a display portion. The display portion may include a first region to display the water level in the wellbore. The display portion may further include a second region separated from the first region, the second region displays at least one parameter corresponding to a pumping unit, and the pumping unit may be fluidically connected to the wellbore. The at least one parameter may include a pumping rate of water from the wellbore and a historical data corresponding to the pumping unit. Further, the display portion may include a third region separated from the first region and the second region. The third region displays at least one parameter of the wellbore. The at least one parameter may include at least one of a temperature, a recovery rate, and a consumption rate.

BRIEF DESCRIPTION OF THE DRA WINGS

The accompanying figures of the drawing, which are included to provide a further understanding of general aspects of the system/method, are incorporated in and constitute a part of this specification. These illustrative aspects of the system/method, together with the detailed description, explain the principles of the system. No attempt is made to show structural details in more detail than necessary for a fundamental understanding of the system and the various ways it is practiced. The following figures of the drawing include:

Figure 1:
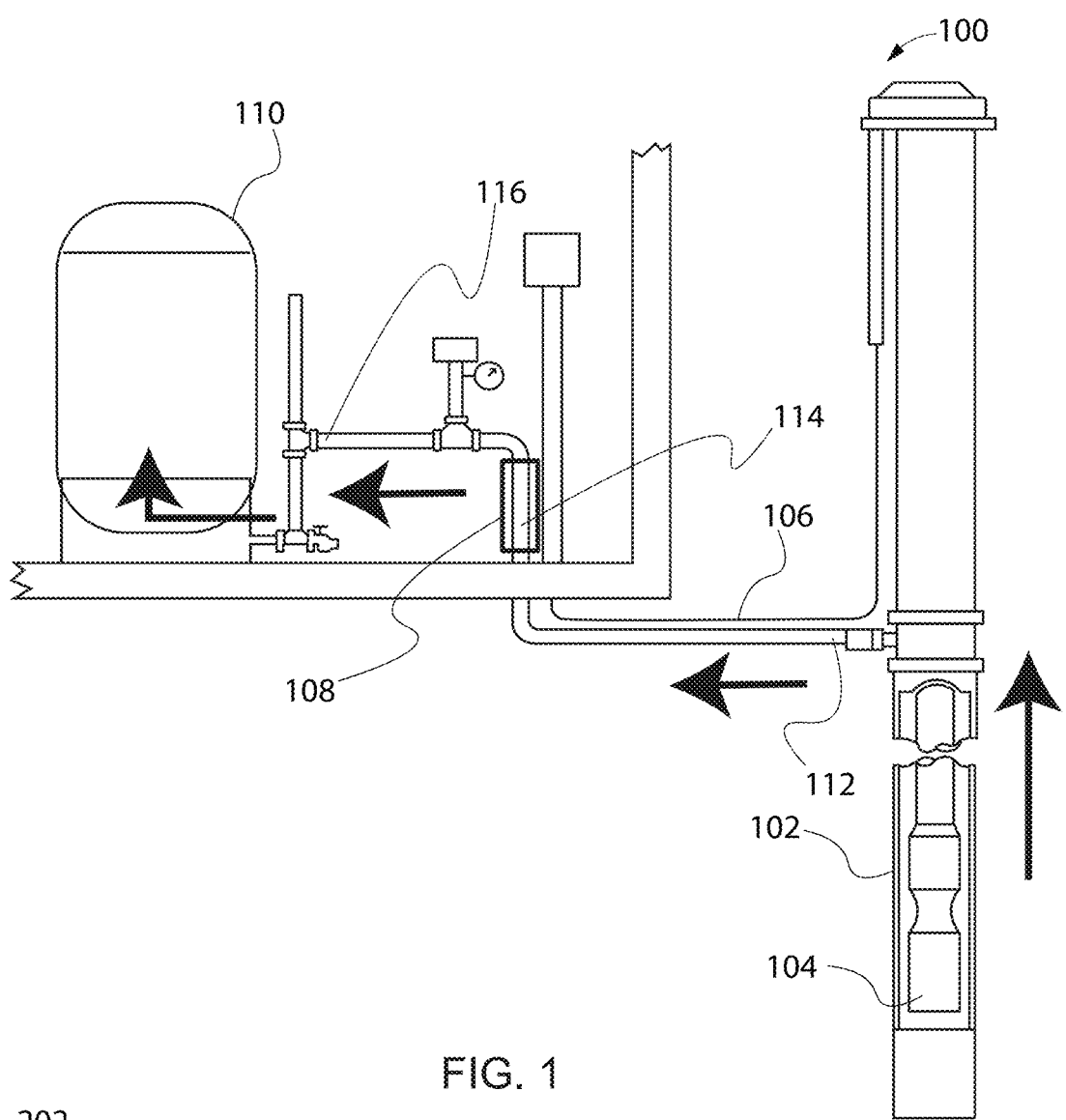
FIG. 1 illustrates a schematic view of a wellbore system.

In the appended figures, similar components and/or features may have the same numerical reference label. Further, various components of the same type may be distinguished by following the reference label with a letter. If only the first numerical reference label is used in the specification, the description applies to any one of the similar components and/or features having the same first numerical reference label irrespective of the suffix.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed configurations. It is intended that the following detailed description be considered as exemplary only, with the true scope and spirit being indicated by the following claims.

Regularly measuring wellbore water and health allows identification and diagnosis of wellbore capacity. Factors that may influence water levels and health of the wellbore may include environmental factors which may include climate changes such as rain, seasonal fluctuations, increased groundwater consumption, vein blockage, and the like. To understand variation and trends of water level in the wellbore, it is recommended that measurements of water level, surface water intrusion (increased activity of coliform bacteria or increase in turbidity after rainstorms) and other water parameters (such as temperature) be iteratively monitored.

As explained earlier, water level measurements are performed using traditional manual methods with steel or electronic tape, a bubbler system, or an air-purge system, which are labor-intensive, invasive, and prone to errors. Moreover, such measurements may also be performed using automated methods with a submersible pressure transducer or an ultrasonic sensor. However, measurements using automated methods are expensive, invasive, and may measure water level up to a limited depth within the wellbore. To measure water level beyond the limited depth, a long-reach wireless protocol may be deployed to obtain such measurements. Moreover, with inaccuracies with the detection of water level, the determination of the wellbore system health may also be compromised.

As an effort to improve the method of measuring water level and health of the wellbore, systems and methods of water level determination and wellbore system health determination are disclosed. The method may be deployed as a software tool in user devices employed by end-users integrated into a unified network, such as Internet-of-Things (IoT) architecture. The user devices may include but are not limited to, smartphones, tablets, computers, or any other electronic equipment capable of communication and interaction. The water level determination method may be configured to generate a set of real-time parameters corresponding to sensor data, with a pump-characteristic data to analyze one or more water level parameters of the wellbore. The water level parameters are further analyzed to determine the water level in the wellbore. Moreover, with the water level and the set of real-time parameters, health of the wellbore may be determined. It must be noted that the health of the wellbore 102 may also include, in its entirety, parameters of the wellbore (recovery rate, temperature, etc.) as well as the health of the wellbore system (pressure tank, pressure switch, fluid connection line, pumping unit, and the like).

FIG. 1 illustrates a schematic view of a wellbore system 100. The wellbore system 100 may include a wellbore 102, a pumping unit 104, a fluid connection line 106, a sensor unit 108, and a pressure tank 110. The wellbore 102 may include a borehole drilled into the ground to extract water or groundwater therefrom. The wellbore 102 may further include, but not limited to, a vertically drilled wellbore or a horizontally drilled wellbore. Further, to extract groundwater from the wellbore 102, the pumping unit 104 may be disposed therein. The pumping unit 104 may be configured to extract and pump groundwater from the wellbore 102 to the pressure tank 110 via the fluid connection line 106.

In an illustrative configuration, the pumping unit 104 may include submersible pumps such as, but not limited to deep well pumps, borehole submersible pumps, stainless steel submersible pumps, and oil-filled pumps. The pumping unit 104 as illustrated herein may also include jet pumps, which may be adapted to a variable frequency drive (VFD) pump, and the like. The pumping unit 104 may be positioned at a predefined depth within the wellbore 102. Particularly, the predefined depth may include a depth at which the groundwater may be available. Hence, the pumping unit 104 may be submerged at the predefined depth in the groundwater present therein.

In an illustrative configuration, the pressure tank 110 may include an expansion tank, such as but not limited to a diaphragm expansion tank, a bladder expansion tank, and the like. As such, in some configurations, the pressure tank 110 may be configured to store water received from the pumping unit 104 via the fluid connection line 106. Furthermore, in addition to the pressure tank 110, a water infrastructure, or a water distribution infrastructure (such as hose spigots, sprinklers etc.) may be configured to store and distribute water received from the pumping unit 104 via the fluid connection line 106.

The fluid connection line 106 may include an inlet 112, an outlet 116, and an intermediate portion 114 disposed between the inlet 112 and the outlet 116. The inlet 112 may be coupled to the pumping unit 104, and the outlet 116 may be coupled to the pressure tank 110. Furthermore, the intermediate portion 114 may be configured to accommodate a sensor unit 108. The sensor unit 108 may be configured to sense one or more parameters of water flowing across the fluid connection line 106. Particularly, the sensor unit 108 may include one or more sensors configured to sense pressure, flow rate, and temperature of water flowing across the fluid connection line 106. This is explained in conjunction with FIG. 2.

Figure 2:
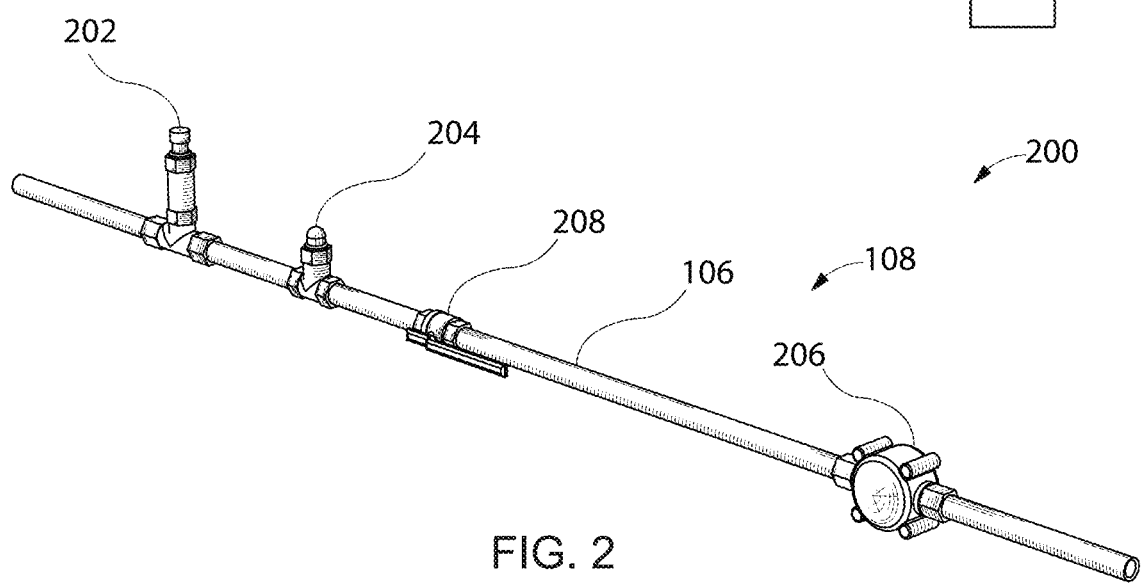
FIG. 2 illustrates a perspective view of a sensor unit disposed on a fluid connection line.

FIG. 2 illustrates a perspective view 200 of the sensor unit 108 disposed on the fluid connection line 106. The sensor unit 108 may include one or more Internet-of-Things (IoT) capable sensors configured to sense the pressure, flow rate, and temperature of water flowing across the fluid connection line 106. Particularly, the sensor unit 108 may include a pressure sensor 202, a temperature sensor 204, and a flow rate sensor 206. Further, the pressure sensor 202 may be configured to sense the pressure of water flowing across the fluid connection line 106. The temperature sensor 204 may be configured to sense the temperature of the water flowing across the fluid connection line, and the flow rate sensor 206 is configured to sense the flow rate of the water flowing across the fluid connection line 106.

The wellbore system 100 may further include a flow control valve 208 fluidically coupled to the fluid connection line 106. The flow control valve 208 may be configured to control the flow rate of water flowing across the fluid connection line 106. In some configurations, the flow control valve 208 may be positioned within sensor unit 108, i.e., between the temperature sensor 204 and the flow rate sensor 206. Therefore, the pressure sensor 202 may be positioned next to the pumping unit 104, followed by the temperature sensor 204, the flow control valve 208, and the flow rate sensor 206. Such arrangement results in reliable measurement of the pressure of water in the fluid connection line 106. Moreover, the flow control valve 208 may be positioned at a predefined distance from the flow rate sensor 206, i.e., about a distance ranging about 6-8 inches. The distance may allow settling of the flow of the water after exiting the flow control valve 208, and hence, a reliable measurement of the flow rate of water may be obtained. The flow control valve 208 may include, but not limited to, a ball valve, gate valve, butterfly valve, and the like.

In an illustrative configuration, and as explained earlier, the sensor data may be analyzed to determine the water level in the wellbore 102. The sensor data sensed by the sensor unit 108 may be transmitted to a cloud server or a remote database server using wireless communication protocols. Further, a computation unit communicably coupled to the cloud server or the remote database may be configured to analyze the sensor data to determine one or more sensor parameters. The sensor parameters may be analyzed with characteristic data of the pumping unit 104, and a water level parameter corresponding to the wellbore may be determined. This methodology to determine the water level may be implemented using a water level determination system, which is explained hereinafter.

Figure 3:
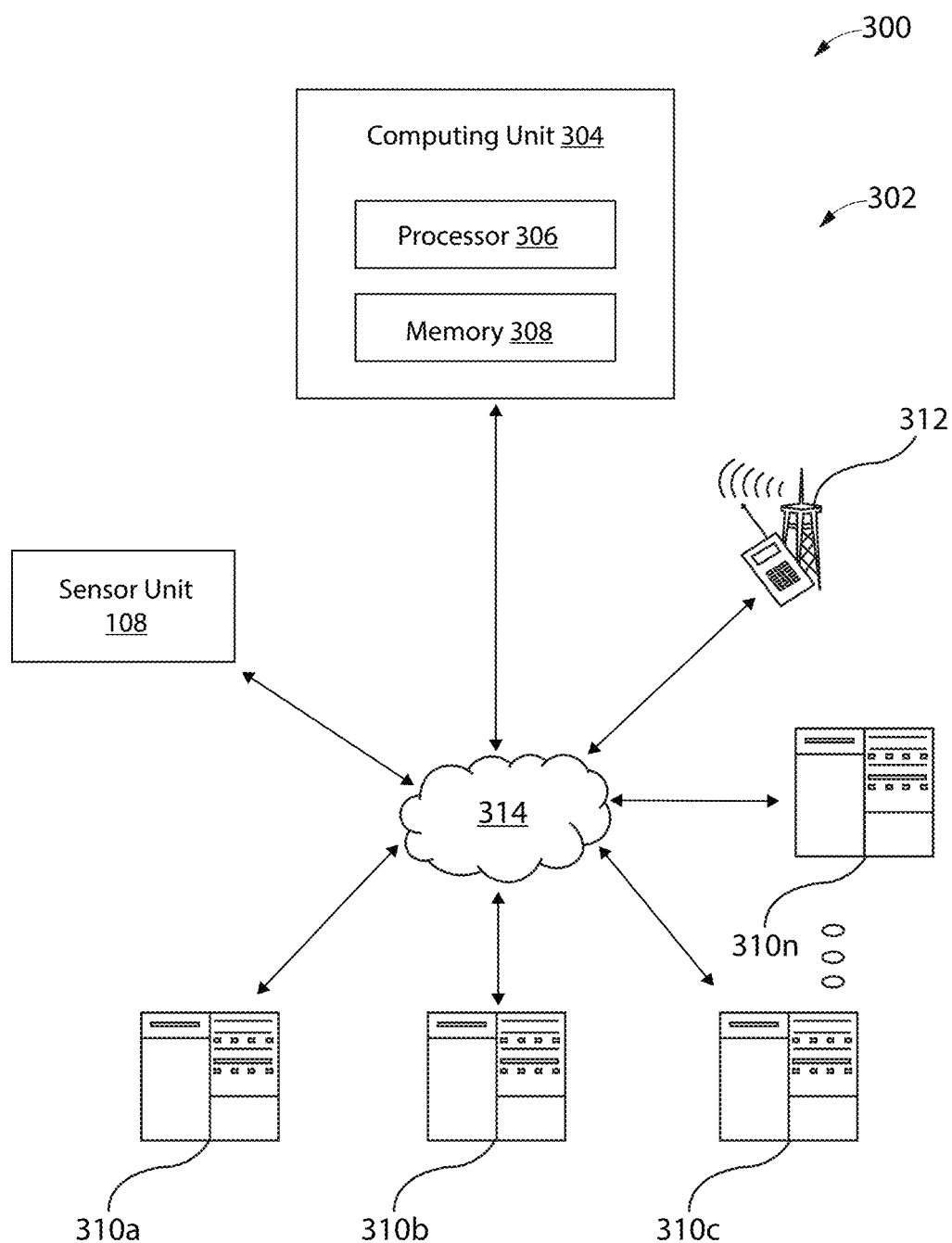
FIG. 3 illustrates a schematic layout of a water level determination system.

FIG. 3 illustrates a schematic layout 300 of a wellbore water level and health determination system 302. The wellbore water level and health determination system 302 may include a computing unit 304. Further, the computing unit 304 may include a processor 306 and a memory 308 communicably coupled to the processor 306. Further, the processor 306 may include a centralized IoT processor which may be configured to collect the sensor data from the sensor unit 108 and determine water level and health in the wellbore 102.

In an illustrative configuration, the processor 306 may include a logic unit with suitable logic, or circuitry, interfaces, and/or code that may be implemented based on temporal and spatial processor technologies, which may be known to one ordinarily skilled in the art. Examples of implementations of the processor 306 may be a Graphics Processing Unit (GPU), a Reduced Instruction Set Computing (RISC) processor, an application specific Integrated Circuit (ASIC) processor, a Complex Instruction Set Computing (CISC) processor, a microcontroller, Artificial Intelligence (AI) accelerator chips, a co-processor, a central processing unit (CPU), and/or a combination thereof.

The memory 308 may include suitable logic, circuitry, and/or interfaces that may be configured to store processor-executable instructions for the processor 306. The memory 308 may store instructions that, when executed by the processor 306, may cause the processor 306 to initiate the process of determining the water level, and health of the wellbore 102. The memory 308 may be a non-volatile memory or a volatile memory. Examples of non-volatile memory may include, but are not limited to a flash memory, a Read-Only Memory (ROM), a Programmable ROM (PROM), Erasable PROM (EPROM), and Electrically EPROM7 (EEPROM) memory. Examples of volatile memory may include but are not limited to Dynamic Random-Access Memory (DRAM), and Static Random-Access Memory (SRAM).

In an illustrative configuration, and with continued reference to FIG. 3, the computing unit 304 may be communicably connected to one or more databases 310a, 310b, 310c . . . 310n (hereinafter referred to as databases 310) over a communication network 314. The databases 310 may be configured to store sensor data received from the sensor unit 108. Moreover, the databases 310 may be configured to store characteristic data corresponding to the wellbore 102, the fluid connection line 106, and the pumping unit 104. Accordingly, the computing unit 304 may be configured to obtain the sensor data from the databases 310 and may be configured to determine sensor parameters such as pressure, temperature, and flow rate of water flowing through the fluid connection line 106 and in the wellbore 102. Further, the computing unit 304 may be configured to analyze the sensor parameters with the characteristic data to determine the water level in the wellbore 102. The water level may be transmitted to external devices 312, which may include a user interface, which may be configured to display the water level to the user. The external devices may include, but not limited to, a smartphone, a mobile device, a laptop, a smartwatch, a personal digital assistant (PDA), an e-reader, and a tablet and the like.

The communication network 314 may be an IoT-based wireless network, and the examples may include but are not limited to, the Internet, Wireless Local Area Network (WLAN), Wi-Fi, Long Term Evolution (LTE), Worldwide Interoperability for Microwave Access (WiMAX), and General Packet Radio Service (GPRS). Various devices in the computing unit 304 may be configured to connect to the communication network 314 in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, Light Fidelity (Li-Fi), 802.16, IEEE 802.11s, IEEE 802.11g, multi-hop communication, wireless access point (AP), device to device communication, cellular communication protocols, and Bluetooth (BT) communication protocols.

Figure 4:
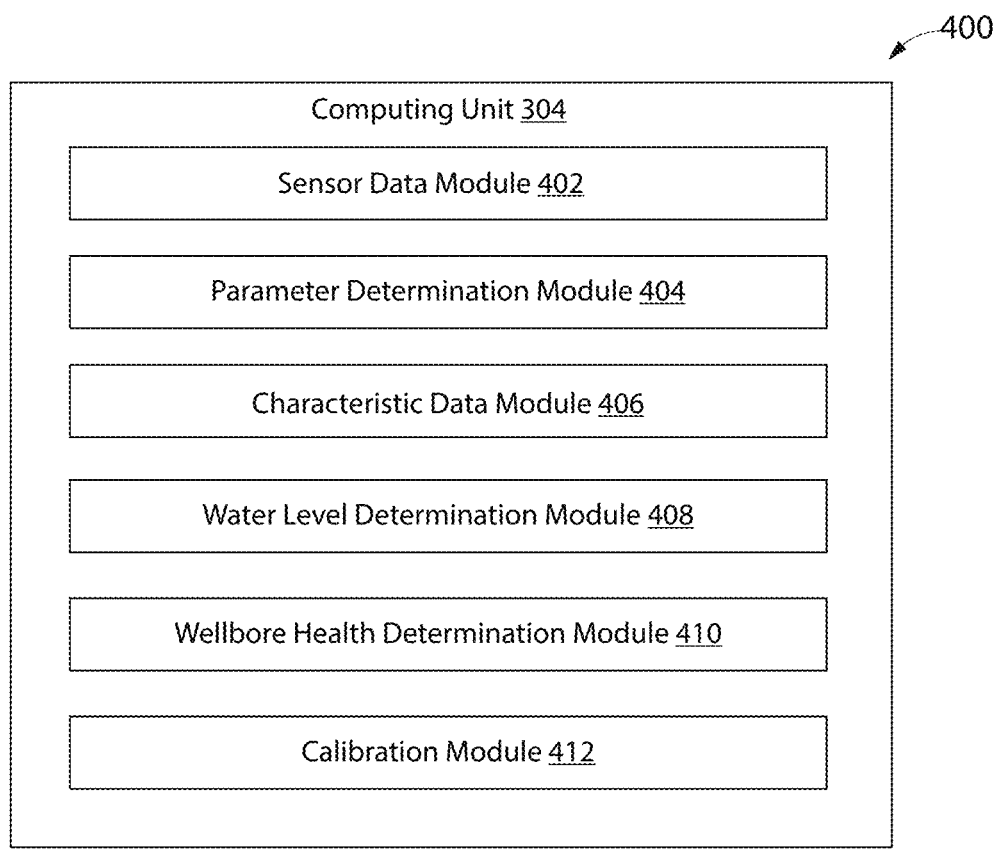
FIG. 4 illustrates a block layout of a computing unit.

FIG. 4 illustrates a block layout 400 of the computing unit 304. The computing unit 304 may be configured to determine the water level and health of the wellbore 102 based on execution, by the processor 306, of one or more functional modules embedded in the memory 308. The one or more functional modules may be stored as stored as a set of instructions, programming code, or a logic-based methodology in the memory 308. The one or more functional modules are explained in detail hereinafter.

In an illustrative configuration, the one or more functional modules may include a sensor data module 402, a parameter determination module 404, a characteristic data module 406, a water-level determination module 408, a wellbore system health determination module 410, and a calibration module 412.

In an illustrative configuration, the sensor data module 402 may be configured to receive sensor data from the databases 310 via the communication network 314. The sensor data as explained earlier, may be sensed by the sensor unit 108 using the pressure sensor 202, the temperature sensor 204, and the flow rate sensor 206.

The parameter determination module 404 may be configured to receive the sensor data from the sensor data module 402. Further, the parameter determination module 404 may be configured to analyze the sensor data obtained from the sensor data module 402 into a set of real-time parameters. For example, the parameter determination module 404 may be configured to acquire sensor data corresponding to the pressure, temperature, and flow rate of the water from the databases 310. After acquisition, the parameter determination module 404 may be configured to implement data transformation methodology on the sensor data. The data transformation methodology may be implemented with, but not limited to Fourier transform, Wavelet transform, Principal Component Analysis (PCA), and the like. Implementation of the data transformation methodology on the sensor data may convert the sensor data corresponding to the pressure, temperature, and flow rate of the water to real-time parameters, i.e., pressure (in bar), temperature (in ° C./° K), for flow rate (gallons per minute) of the water flowing through the fluid connection line 106.

The characteristic data module 406 may be configured to obtain characteristic data from the databases 310 over the communication network 314. The characteristic data may include one or more characteristic data corresponding to the pumping unit 104. The characteristic data of the pumping unit 104 and the wellbore 102 may include, but not limited to, the discharge-head (Q-H) curve, efficiency curve, power curve, Net Positive Suction Head (NPSH) curve, depth at which pump may be positioned in the wellbore 102, diameter of the wellbore 102, diameter of the pipe used in the fluid connection line 106, and the like. The characteristic data may be acquired from the manufacturers of the pumping unit 104, and from specialists after setting up the wellbore system 102. Further, the characteristic data may be stored in the databases 310 in a form of lookup tables, adjacency matrix, adjacency list, and the like.

The water-level determination module 408 may be configured to acquire the characteristic data from the characteristic data module 406, and the set of real-time parameters corresponding to the sensor data from the parameter detection module. Furthermore, the water-level determination module 408 may be configured to calculate a water level parameter. The water level parameter may include depth-to-water in the wellbore 102, using one or more empirical relationships as a function of the real-time parameters and the characteristic data. The depth-to-water in the wellbore 102 indicates the availability of water at a depth measured from an opening of the wellbore 102, or from a ground level. The depth measured may be subtracted from overall depth of the wellbore 102, to determine water level from a bottom of the wellbore 102. The depth may also be subtracted from the depth at which the pump may be positioned within the wellbore 102, to determine the water level above the pumping unit 104.

The wellbore system health determination module 410 may be configured to determine the health of the wellbore system 100. The wellbore system health determination module 410 may be configured to monitor wellbore parameters over a predefined time period. The wellbore system health determination module 410 may, based on the monitoring of the real-time parameters and the depth-to-water may determine wellbore parameters such as static level, drawdown, recovery/yield of the wellbore 102, and the like. Further, the wellbore system health determination module 410 may be configured to analyze the real-time parameters against a set of rules. The set of rules may include, but not limited to, the real-time parameters not to exceed a first threshold, a water level not below a second threshold, parameters related to the wellbore system 100 (the pumping unit 104, fluid connection line 106, sensor unit 108) exceeding or falling below a predefined threshold, and the like. Accordingly, whenever the set of rules is breached, i.e., the real-time parameters exceeding a first threshold, or the water level below the second threshold, the wellbore system health determination module 410 may determine an anomaly indicating deteriorating health of the wellbore 102 of the wellbore system 100. Additionally, the wellbore system health determination module 410 may also be configured to establish a set of rules against parameters related to the wellbore system 100, which may include, but not limited to setting thresholds against voltage failure rates of the pumping unit, variation in sensor readings, and the like. Breach in these set of rules may indicate deterioration of the equipment health of the wellbore system 100, i.e., health of the pressure tank 110, the sensor unit 108, and the like.

The calibration module 412 may be configured to calibrate the pumping unit 104 using one or more calibration routines. The pumping unit 104 over predefined pumping cycles may get sedimented, may experience wear and tear, or may experience cavitation. As a result, the flow rate, pressure or head may be derated or decreased. Therefore, to maintain suitable water level accuracy in such scenarios, the characteristic data may be calibrated with the calibration routine. The calibration routine may include obtaining maximum and minimum value of the sensor data by actuating, manually or electronically, the flow control valve 210 (refer to FIG. 2). Accordingly, the sensor data may be calibrated with the maximum and minimum value of the sensor data, to determine calibrated depth-to-water in the wellbore 102.

The sensor data, as explained earlier, may be sensed by the sensor unit 108. The sensor unit 108 may include a pressure sensor 202, a temperature sensor 204, and a flow rate sensor 206. It must be noted that each sensor in the sensor unit may be an IoT-compatible sensor, i.e., each sensor may be configured to sense and transmit sensor data to the database via an IoT network. Each of these sensors is explained in detail, in conjunction with FIGS. 5-8.

Figure 5:
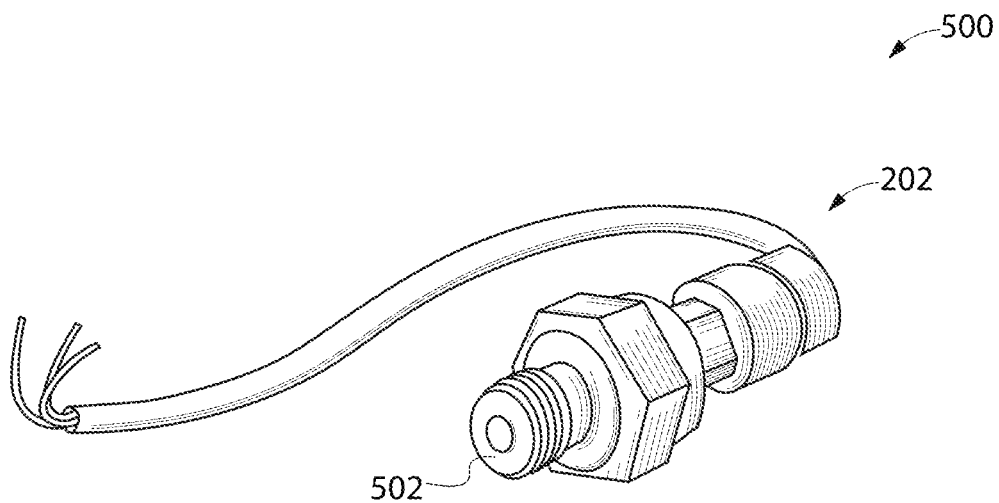
FIG. 5 illustrates a perspective view of a pressure sensor.

FIG. 5 illustrates a perspective view 500 of a pressure sensor 202. The pressure sensor 202 may be coupled to the fluid connection line 106 and may be configured to sense the pressure of water flowing across the fluid connection line 106. Further, the pressure sensor 202 may include a sensor head 502 coupled to the fluid connection line 106 using one or more sensor fittings (not shown in figures). The sensor head 502 may be configured to sense the pressure of water flowing through the fluid connection line 106 and may be configured to generate sensor data corresponding to the pressure. The pressure sensor 202 may include but is not limited to, Hall-effect sensors, piezoelectric sensors, capacitive pressure sensors, and the like. The pressure sensor 202 may be configured to sense the pressure of water in a ranging about 150-200 Psi, or at higher ranges (for example, about 100-250 Psi) and at a temperature ranging from about 4° C.-20° C.

Figure 6A:
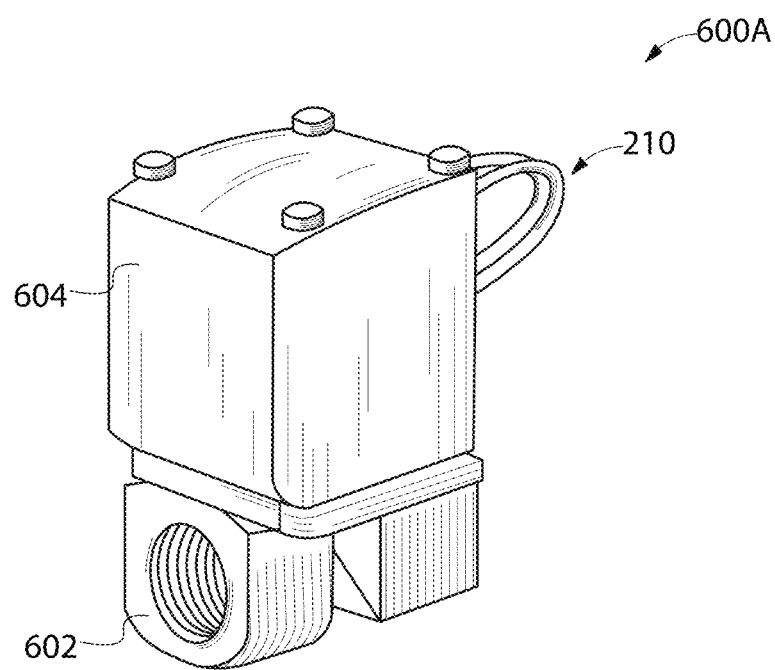
FIG. 6A illustrates a perspective view of a flow control valve.

FIG. 6A illustrates a perspective view 600A of the flow control valve 210. The flow control valve may include a fitting portion 602, and a solenoid actuator 604 coupled to the fitting portion 602. The fitting portion 602 may be coupled to the fluid connection line 106. Further, the fitting portion 602 may include a gate, or a valve which may be operatively coupled to the solenoid actuator 604. The solenoid actuator 604 may be actuated based on an actuation signal received from an end-user (via the computing unit 304) to manipulate the valve in the fitting portion 602 to reduce or restrict the flow of water through the fluid connection line 106. The manipulation of the valve in the fitting portion 602 may be performed during a calibration routine, which is explained later.

Figure 6B:
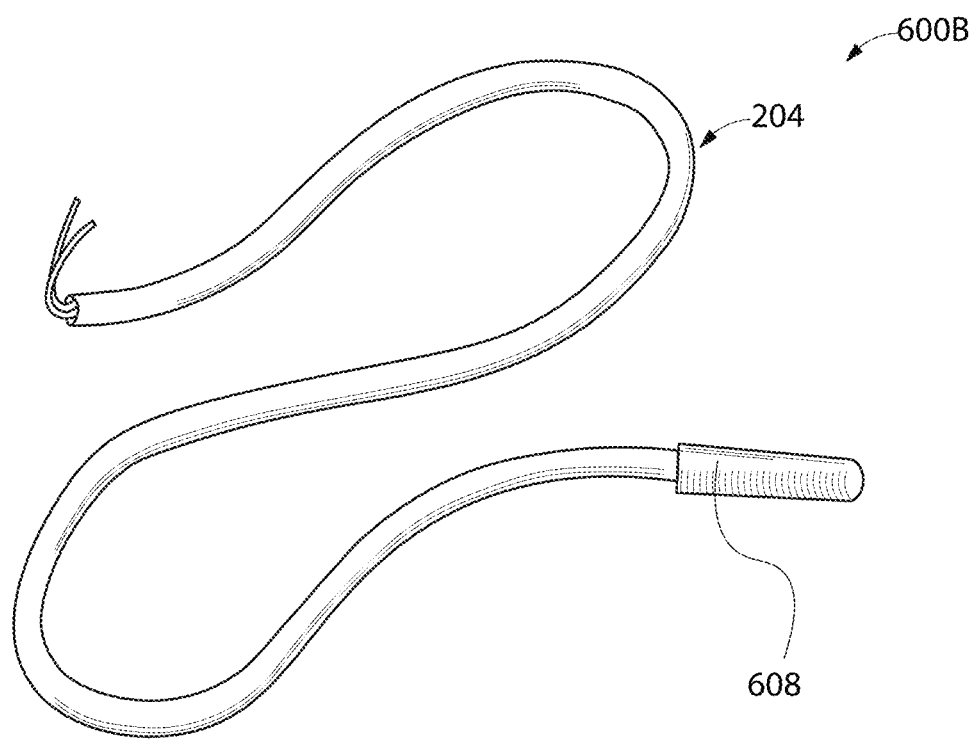
FIG. 6B illustrates a perspective view of a temperature sensor.

FIG. 6B illustrates a perspective view 600B of a temperature sensor 204. The temperature sensor 204 may include a sensing portion 608. Further, the sensing portion 608 may be coupled to the fluid connection line 106 such the sensing portion 608 may be directly in contact with the water flowing through the fluid connection line 106. As may be appreciated, direct contact of the water with the sensing portion 608, and accurate sensor data of the temperature of the water may be obtained. The sensor body 604 may include, but is not limited to probe-type thermocouples, resistance temperature detectors (RTDs), and the like.

Figure 7:
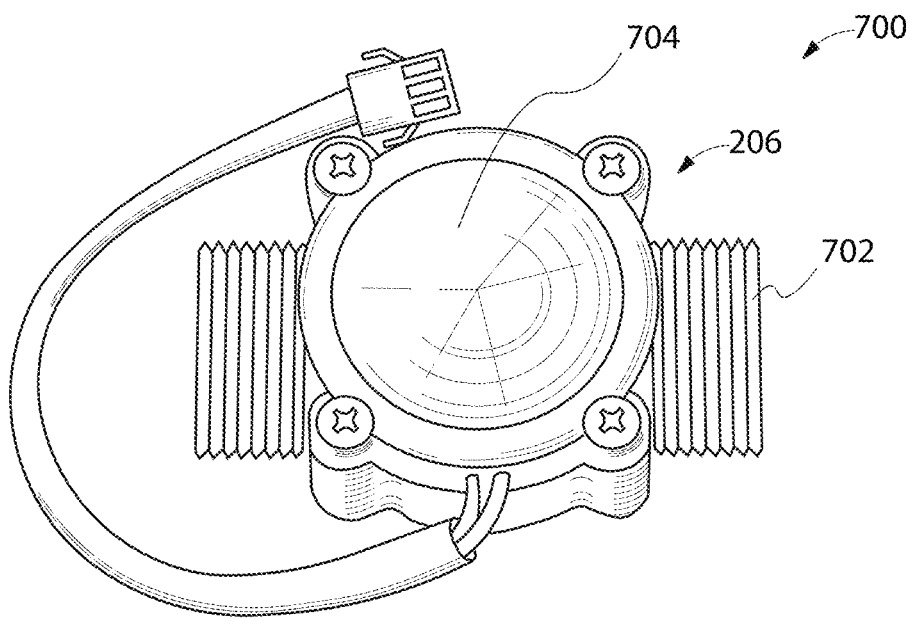
FIG. 7 illustrates a perspective view of a flow rate sensor.

FIG. 7 illustrates a perspective view 700 of the flow rate sensor 206. The flow rate sensor 206 may also include a fitting portion 702, and a sensor body 704. The sensor body 704 may be coupled to the fitting portion 702. Further, the fitting portion 702 may be coupled to the fluid connection line 106. Accordingly, the flow rate sensor 206 may be in direct contact with the water flowing across the fluid connection line 106 and may be configured to generate sensor data corresponding to the flow rate of the water flowing across the fluid connection line 106. In some configurations, the flow rate sensor 206 may include but is not limited to, mechanical flow meters, electromagnetic flow meters, ultrasonic flow meters, and the like.

The sensor data obtained from the sensor unit 108 may be transmitted to the databases 310. Further, the computing unit 304 with the sensor data module 402 may acquire the sensor data. Furthermore, the computing unit 304 may be configured to execute parameter determination module 404 to convert the sensor data to real-time parameters. Thereafter, the computing unit 304 may be configured to analyze the real-time parameters with the characteristic data to determine the depth-to-water in the wellbore 102. This is explained in detail, hereinafter.

Figure 8:
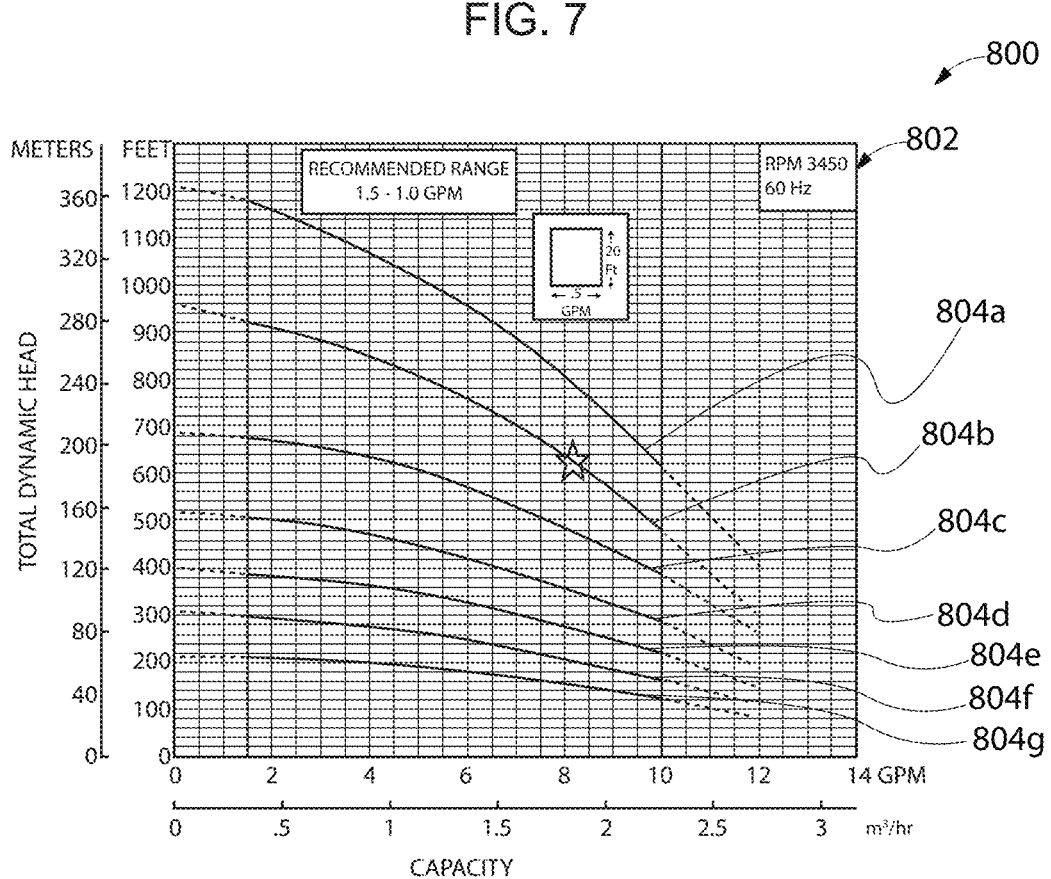
FIG. 8 illustrates a graphical representation of the pump-characteristic data.

FIG. 8 illustrates a graphical representation 800 of the characteristic data 802. As explained earlier, the characteristic data of the pumping unit 104 may include, but not limited to, the discharge-head (Q-H) curve, efficiency curve, power curve, Net Positive Suction Head (NPSH) curve, and the like. For example, the characteristic data 802 herein depicts a Q-H curve for a plurality of pumps, which may also include pump of same series having different sizes of impeller. As seen, the characteristic data 802 may include a plurality of curves 804a, 804b, 804c . . . 804g (hereinafter referred to as curves 804). Each curve from the curves 804 represents the performance characteristics of a specific pumping unit. For example, curve 804a may represent characteristics of Pumping unit 1, curve 804b may represent characteristics of Pumping unit 2, curve 804c may represent characteristics of Pumping unit 3, and the like. The characteristic data 802 may be stored in the databases 310 as a look-up table, or a polynomial equation, which may be analyzed by the computing unit 304 to determine depth-to-water for the wellbore 102. For example, the following table represents a look-up table corresponding to the characteristic data 802 in FIG. 8.

TABLE 1

Exemplary Lookup table for the characteristic data 802

| Pump | Curve | Discharge (m³/hour) | Head (meters) |
| --- | --- | --- | --- |
| Pumping unit 1 | 804a | 4 | 315 |
| Pumping unit 2 | 804b |  | 290 |
| Pumping unit 3 | 804c |  | 220 |
| Pumping unit 4 | 804d |  | 160 |
| Pumping unit 5 | 804e |  | 120 |
| Pumping unit 6 | 804f |  | 90 |
| Pumping unit 7 | 804g |  | 60 |

Table 1 depicts an exemplary look-up table for the total head of each pumping unit corresponding to a flow rate or discharge of 4 m³/hour. As may be appreciated, the databases 310 may be configured to store similar look-up tables with various values of the discharge and total head corresponding to the discharge for each pumping unit. The computing unit 304 may analyze these look-up tables with the characteristic data module 406 to determine a common curve that may apply to all pumping units in the characteristic data 802. This is explained in FIG. 9.

Figure 9:
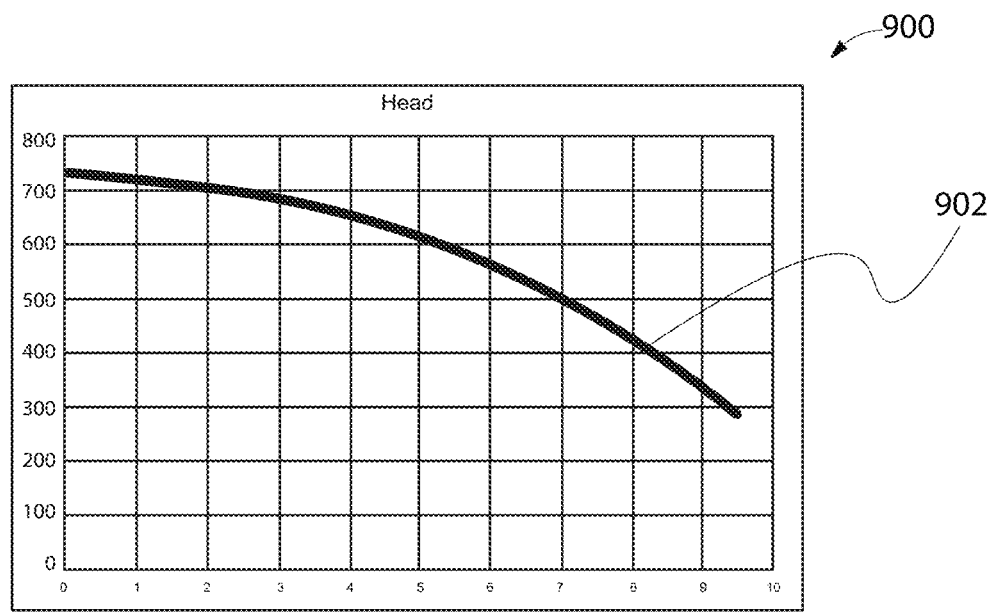
FIG. 9 illustrates a graphical representation of a common curve generated by the computing unit.

FIG. 9 illustrates a graphical representation 900 of a common curve 902 generated by the computing unit 304. As explained earlier, the databases 310 may be configured to store a plurality of look-up tables corresponding to the characteristics data of the pumping unit 104. The computing unit 304, with the characteristic data module 406, may be configured to acquire the plurality of look-up tables and generate a common characteristic data for the pumping unit 104 using various techniques, such as but not limited to direct indexing, hashing techniques, and the like. The common characteristic data may be represented by a common curve digitized into a multi-order polynomial, which is represented below:

$$H(t) = \beta_6 q^6 + \beta_5 q^5 + \beta_4 q^4 + \beta_3 q^3 + \beta_2 q^2 + \beta_1 q + \beta_0 \quad (1)$$

where:
H(t)=total head (in feet);
$\beta_6 \ldots \beta_1$=pump constants corresponding to the pumping unit 104; and
q=discharge (GPM)

Therefore, for real-time parameters of the flow rate (or discharge), the corresponding head may be determined by the computing unit 304 using equation (1). The head determined, along with real-time parameters such as pressure and temperature of water, may be acquired by the computing unit 304 with the water-level determination module 408. Using the acquired head, pressure, and temperature, the computing unit 304 with the water-level determination module 408 may be configured to calculate the depth-to-water using the following equation:

$$D(t) = H(t) - (h_f) - (kp) + Z \quad (2)$$

where:
D(t)=depth to water, or depth at which water is available in the wellbore 102;
k=conversion factor;
$h_f$=systematic head loss;
p=pressure of water flowing across the fluid connection line 106;
Z=difference in height between the top of the wellbore 102 and position of the sensor unit 108.

The systematic head loss $h_f(t)$ may include friction losses occurring in the fluid connection line 106. The friction losses may occur due to variations in flow, and design of the pipe of the fluid connection line 106, such as bends, length, inner diameter, velocity of the fluid flowing through, and the like. Additionally, parameters related to the design may be stored in the databases 310. The systematic head loss $h_f(t)$ may be calculated by using the Darcy-Weisbach equation, which is:

$$h_f(t) = f \times \frac{L}{D} \times \frac{V^2}{2g} \quad (3)$$

where:
$h_f$=head loss (ft);
f=friction factor in the fluid connection line 106;
L=length of pipework (ft) of the fluid connection line 106;
D=inner diameter of pipework (ft) of the fluid connection line 106;
V=velocity of fluid (ft/s) in the fluid connection line 106; and g=acceleration due to gravity ($f_t/s^2$)).

The computing unit 304 may be configured to determine the depth-to-water using equations (1), (2), and (3). Particularly, the computing unit 304 may be configured to execute a methodology for determining the depth-to-water. The methodology is explained in detail in conjunction with FIG. 10.

Figure 10:
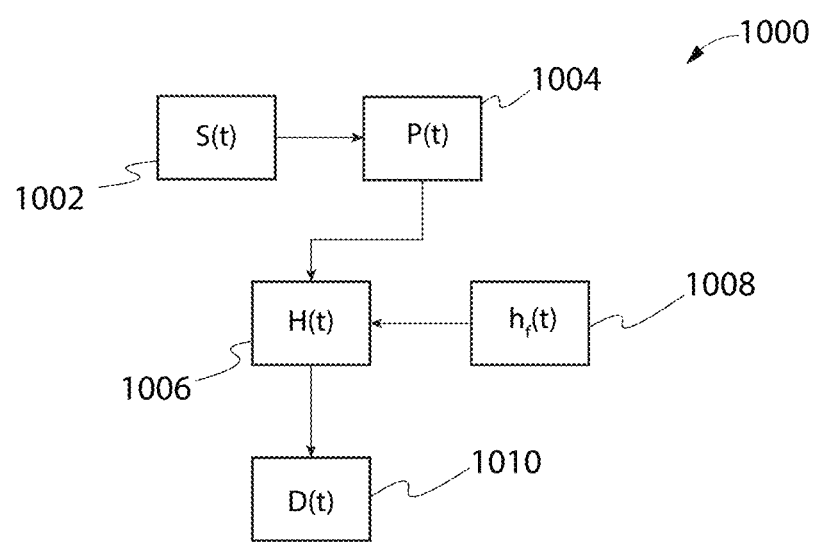
FIG. 10 illustrates a flowchart of a methodology for calculating depth-to-water of the wellbore.

FIG. 10 illustrates a flowchart 1000 of a methodology for calculating depth-to-water of the wellbore 102. The methodology may include a first step 1002, in which sensor data S (t) may be obtained by the computing unit 304 using the sensor data module 402. The sensor data as explained earlier, may include sensor values recorded corresponding to the pressure, flow data, temperature, and the like.

At step 1004, the sensor data S (t) may be converted to real-time parameters P(t) by the computing unit 304 with the parameter determination module 404. As explained earlier, the sensor data S (t) may be converted to real-time parameters P(t) using any data transformation techniques, such as Fourier transform, Wavelet transform, Principal Component Analysis (PCA), and the like.

At step 1006, the computing unit 304 may be configured to analyze the real-time parameters P(t) with the characteristic data stored in the databases 310 to obtain a total head H(t) for the pumping unit 104. As explained earlier, the total head H(t) may be based on the real-time parameters P(t) such as the discharge or flow rate of the water. For the corresponding flow rate, the total head H(t) may be calculated by the computing unit 304 with equation (1).

Moreover, at step 1008, the computing unit 304 may be configured to calculate the systematic head loss $h_f(t)$. The systematic head loss $h_f(t)$ may be calculated with the design parameters stored in the databases 310. Therefore, at step 1010, the computing unit 304, with the water-level determination module 408, may be configured to calculate depth-to-water D(t) with the systematic head loss $h_f(t)$, the total head, and the real-time parameters P(t).

In addition to the measurement of the depth-to-water D(t), the computing unit 304 may be configured to determine the health of the wellbore 102 with the wellbore system health determination module 410. Particularly, the computing unit 304, with the wellbore system health determination module 410 may be configured to monitor wellbore parameters based on the real-time parameters P(t) along with depth-to-water D(t), to determine the health of the wellbore 102 and the health of the wellbore system 100. This is explained in detail in conjunction with FIGS. 11-12.

Figure 11A:
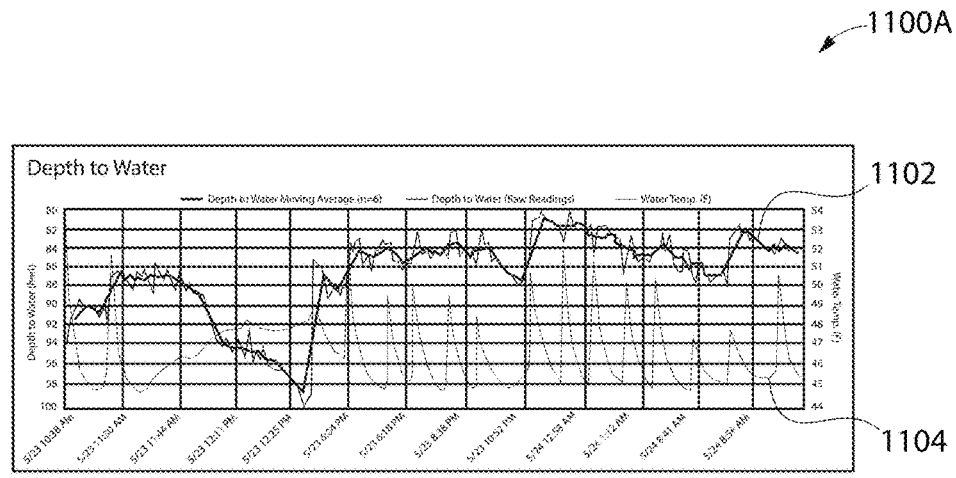
FIG. 11A illustrates a graphical representation of the depth-to-water and the real-time parameters monitored over a predefined time period.

FIG. 11A illustrates a graphical representation 1100A of the depth-to-water and the real-time parameters during pumping of water from the wellbore 102, using the pumping unit 104. The graphical representation 1100A is collated with a depth-to-water and the real-time parameters over various pump cycles in a predefined time period. The depth-to-water and the real-time parameters may be determined when the pumping unit 104 may be in an operational condition. However, the depth-to-water and the real-time parameters may not be determined when the pumping unit 104 may be in a non-operational condition, as no flow may be detected across the fluid connection line 106.

As the pumping unit 104 enters an operational condition, the flow may be detected across the fluid connection line 106. Therefore, the computing unit 304 may be configured to determine the depth-to-water and the real-time parameters with the sensor data based on the detection. Furthermore, the depth-to-water after being calculated, may be plotted to determine the overall curve 1102. It must be noted that after entering the operational condition, the depth-to-water calculated may illustrate a recovered water level in the wellbore. Accordingly, the curve 1102 may initiate from point 1108, indicating the recovered water level in the wellbore 102.

Over the predefined time period, the computing unit 304 may also be configured to predict and monitor the temperature, flow rate, and pressure of the water flowing across the fluid connection line 106. As such, in some configurations, the graphical representation 1100 depicts a temperature trend of the water when pumped over various pumping cycles of the pumping unit 104.

As commonly known, the temperature of the water deep in the wellbore 102 may be less than the temperature of the water flowing across the fluid connection line 106. Hence, by following the curve 1104, it may be noticed that the temperature of the water may be about 51° F. at 10:38 AM and about 45° F. at 12:25 PM on the 23$^{rd}$ of May. The higher temperature (51° F.) may be interpreted as the temperature of the water being present across the fluid connection line 106 during the initiation of the pumping cycle. As more water may be pumped from the wellbore 102, the water present deep in the wellbore 102 may be pumped, and hence, may flow through the temperature sensor 204. As a result, a lower temperature of the water (45° F.) may be sensed. Similarly, the computing unit 304 may be configured to monitor the real-time parameters such as the flow rate of water, or pressure of water across the fluid connection line 106.

Figure 11B:
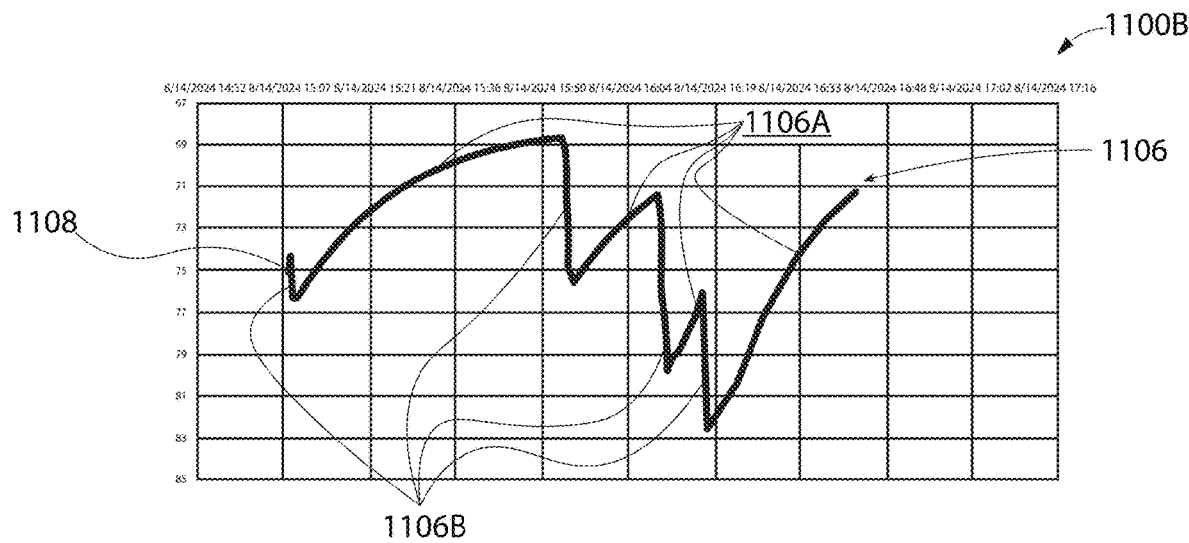
FIG. 11B illustrates a graphical representation of a predicted recovery rate and the depth-to-water of the wellbore.

FIG. 11B illustrates a graphical representation of the predicted recovery rate and the depth-to-water of the wellbore 102. The predicted recovery rate and the depth-to-water may be collated to form a curve 1106, which may include first curve portions 1106A depicting a predicted recovery rate, and second curve portions 1106B for depth-to-water after the pumping unit 104 enters an operational condition. The predicted recovery rate depicted by the first curve portions 1106A may be calculated based on a depth-to-water over a specified time period. Particularly, the computing unit 304 may be configured to utilize the depth-to-water at various timestamps in an equation to predict future recovery rates for each cycle of the pumping unit 104. The equation, is as follows:

$$R(t)pred = (D(t-1)) - \left(R(t) - \frac{R(t) \times Dr(t) - D(t-1)}{Dr(t) - S(t)}\right) \times \frac{t}{k} \quad (4)$$

Where,
R(t)pred=predicted recovery level of the wellbore 102;
D(t−1)=previous depth-to-water of the wellbore 102, or depth-to-water at timestamp (t−1);
R(t)=Recovery of water of the wellbore 102;
Dr(t)=Maximum Drawdown, or maximum consumption of water from the wellbore 102;
k=water storage per depth conversion factor; and
t=time elapsed from calculation of D (t−1).

To determine the health of the wellbore system 100, the computing unit 304, with the wellbore system health determination module 410 may be configured to establish a set of rules against wellbore parameters, which may be obtained from monitored depth-to-water, or the monitored real-time parameters. The wellbore parameters may include a wellbore system data and a wellbore data. The wellbore system data may include, but not limited to, at least one of a failure rate of the pressure tank, a failure rate of the pumping unit, a wear rate of the pumping unit, a rapid cycling rate of the pumping unit, derating of the pumping unit, a variation of pressure in the fluid connection line, a rate of leakage of water from the fluid connection line, and the like. Further, the wellbore data may include, but not limited to, a current water level in the wellbore 102, a static water level in the wellbore 102, a maximum drawdown in the wellbore 102, a water storage quantity in the wellbore 102, and the predicted recovery rate of water level.

The set of rules may include elementary conditions, such as the wellbore parameters not exceeding, or falling below a predefined threshold. The computing unit 304, with the wellbore system health determination module 410 may be configured to identify a breach in the set of rules. For example, if the difference in temperature of water falls below the predefined threshold, or failure rate of the pumping unit 104 exceeds a predefined threshold may indicate inadequate health of the pumping unit, or if the rate of decrease in flow rate falls below a predefined threshold may identify a potential leak in the fluid connection line 106. Such conditions may be flagged as an anomaly, or a breach of the set of rules. The breach in the set of rules may identify a compromised state or a deteriorating health of the wellbore system 100. Accordingly, such breach in rules may be notified to the user via a notifier, such as a message, or an alarm-based notification displayed on the external devices 312.

Figure 12:
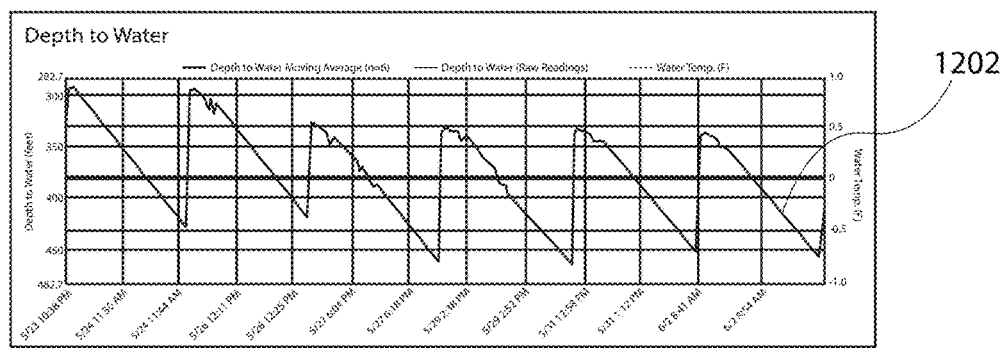
FIG. 12 illustrates a graphical representation of the depth-to-water and the real-time parameters monitored and averaged over a predefined time period.

FIG. 12 illustrates a graphical representation 1200 of the depth-to-water and the real-time parameters during pumping of water from the wellbore 102. Similar to the graphical representation 1100A, the graphical representation 1200 determines a collated data of the depth-to-water and the real-time parameters for household setups which may include, but not limited to, cistern setup. Accordingly, the depth-to-water and the real-time parameters may be calculated based on sensor data obtained when the pumping unit 104 enters the operational condition, and the predicted recovery rate may be calculated with equation (4). It must be noted that due to household needs, the pumping unit 104 may be activated when water storage therein may be reduced to below a predefined threshold. Therefore, the pumping cycles of the pumping unit 104 may be longer for cistern setups as compared to the setup of FIG. 1. Accordingly, the drawdown for cistern setups may be higher as compared to the drawdown of the setup of FIG. 1. Hence, as seen, the averaged curve 1202 may include multiple cycles on the pumping unit 104, with increased drawdown (decrease in water level) of the wellbore 102.

With the wellbore system health determination module 410, the computing unit 304 may be configured to establish the set of rules against the average depth-to-water and real-time parameters monitored over the predefined time period, and may be configured to determine an underlying compromised state of the wellbore 102. For example, if the average of the difference in temperature of water, or the average of the depth-to-water falls below the predefined threshold, such conditions may also be flagged by the wellbore system health determination module 410 with the computing unit 304 as a breach in the set of rules.

The pumping unit 104 is subjected to wear and tear due to prolonged exposure to water and particulates in the wellbore 102. Environmental variables, such as fluctuations in water pressure, temperature variations, and the presence of abrasive substances contribute to deviations in the performance of the pumping unit 104. Such deviations may include, but not limited to derating the total head and the flow rate. Accordingly, such deviations may result in an inaccurate determination of the depth-to-water of the wellbore 102. Therefore, the characteristic data may be calibrated via a calibration routine to eliminate such deviation and thus obtain the depth-to-water of the wellbore 102. The calibration routine is explained in detail in conjunction with FIGS. 13-15.

Figure 13:
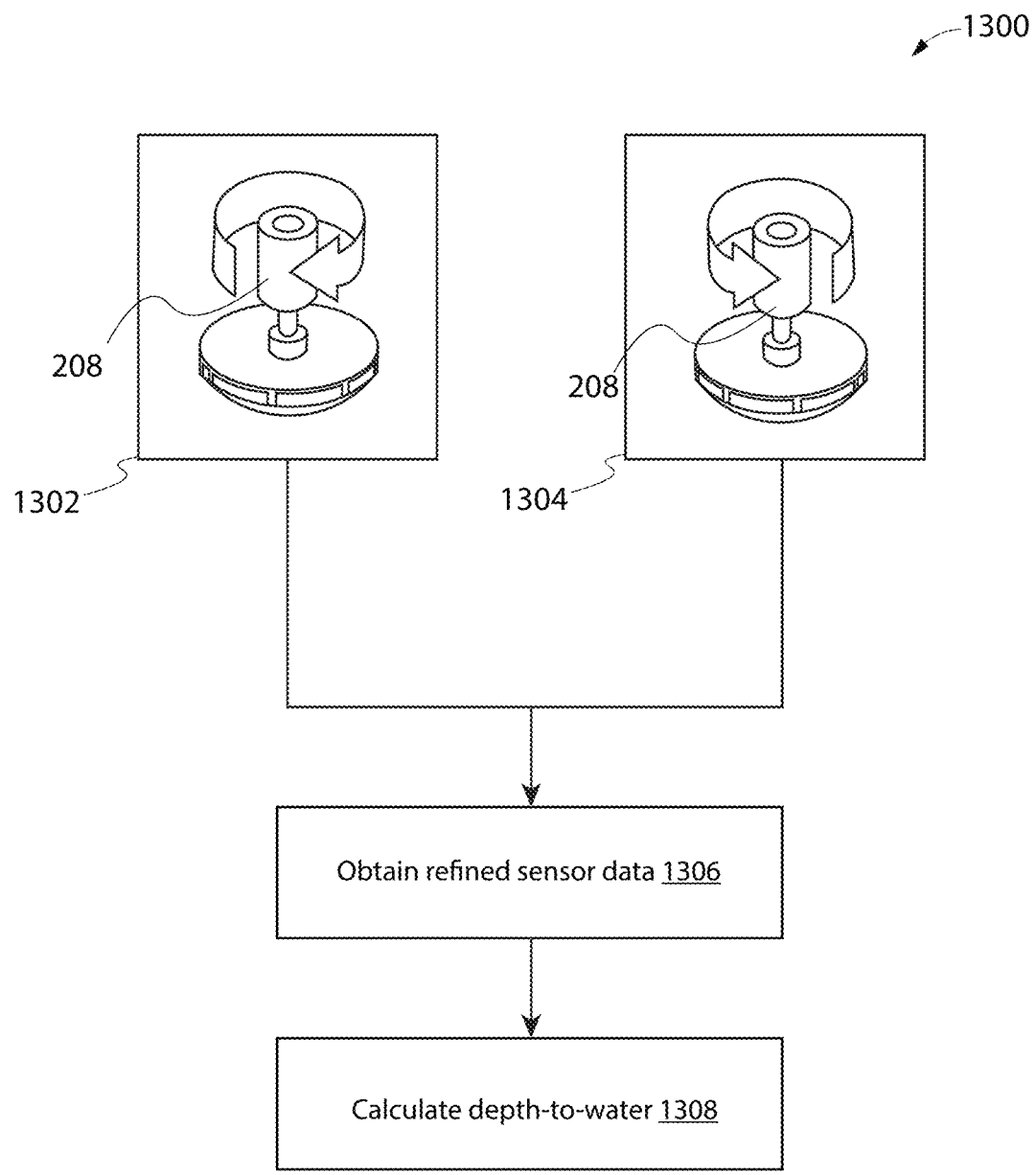
FIG. 13 illustrates a flowchart of a calibration routine to calibrate the pump-characteristic data.

FIG. 13 illustrates a flowchart 1300 of a calibration routine to calibrate the characteristic data. The calibration routine may be implemented through one or more steps. For example, at step 1302 and step 1304, the calibration routine may be initiated by actuating the flow control valve 208 between a completely opened position and a completely closed position. As such, in some configurations, the flow control valve 208 may be manually actuated, or electronically actuated. For example, the flow control valve 208 may be manually actuated by a user, and the flow control valve 208 may be electronically operated using a solenoid actuator.

With such actuation, at step 1306, a refined sensor data may be obtained. For example, when the flow control valve 208 may be actuated to the completely opened position, refined sensor data such as a minimum rating pressure of the pumping unit 104 may be obtained. In other words, a minimum pressure of the water flowing through the fluid connection line 106 may be obtained as water freely flows through the pressure sensor 202. Further, when the flow control valve 208 may be actuated to the completely closed position, a maximum rating pressure of the pumping unit 104 may be obtained. In other words, a maximum pressure of the water flowing through the fluid connection line 106 may be obtained. This is due to the flow of water being obstructed in the fluid connection line 106 with the flow control valve 208 actuated to the completely closed condition.

The refined sensor data may be utilized by the computing unit 304, with the calibration module 412 to calculate a percentage of derated head and a percentage of derated flow rate generated by the pumping unit 104. The percentage of derated flow may be calculated using the following equation:

$$(\%)def(t) = \frac{v}{\% \ der} \quad (5)$$

where:
(%) def(t)=Percentage (%) of derated flow rate of water flowing across fluid connection line 106;
v=measured flow rate of water flowing across fluid connection line 106; and
% der=Percentage (%) of derating of the pumping unit 104 obtained from refined sensor data.

Similarly, the percentage of derated head of the pumping unit is calculated using the equation:

$$(\%)deh(t) = (\text{head}) \times (1 - (\% \ der)) \quad (6)$$

where,
(%) deh(t)=Percentage (%) of derated head; and
% der=Percentage (%) of derating of the pumping unit 104 obtained from refined sensor data.

Further, the calibration module 412 may be configured to calibrate the characteristic data with the derating of the head and the flow rate, i.e., determine a head with the derated flow rate to obtain a calibrated characteristic data. For example, the derated head may be determined by a multiplication of the ((%) deh(t)) with the head of the pumping unit 104. Similarly, the derated flow rate may be computed based on multiplication of the (%) def(t) with the flow rate of the pumping unit 104. The head, and flow rate herein may be acquired from the characteristics data of the pumping unit 104. The calibrated characteristic data may be utilized by the computing unit 304 to determine a modified depth-to-water. The modified depth-to-water (moD(t)) is calculated using the following equation:

$$moD(t) = \{(\text{head at derated flow rate}) - (\text{derated head})\} - (h_f) - (kp) + Z \quad (7)$$

At step 1308, the calibrated characteristic data may be utilized by the computing unit 304 to calculate a calibrated depth-to-water. The computing unit 304, with the calibration module 412 may be configured to execute an iterative estimation with an iterative solver. The iterative estimation may include determining a combination of variables to reduce an error equation. The variable may be selected from an initial water level in the wellbore 102, predicted water level in the wellbore 102, the percentage of head derated (%) deh(t), and the percentage of flow rate derated (%) def(t).

The initial water level in the wellbore 102 may be determined using the depth-to-water as described in preceding configurations, or by using traditional methods explained earlier. With the initial water level, a predicted water level may also be determined by the computing unit 304 with the following equation:

$$PL(t) = (\text{water level})_{t=0} + \frac{v \times t}{k} \quad (8)$$

where,
PL(t)=predicted water level in the wellbore 102;
(water level)$_{t=0}$=initial water level in the wellbore 102;
v=measured flow rate of water flowing across fluid connection line 106; and
k=water-storage per foot conversion factor.

It must be noted that the value of the initial water level (determined using D(t)) may be modified by the iterative solver. However, for determining predicted value of water level, the values of PL(t) may be modified by increasing the measured flow rate (v) corresponding to a predicted value, i.e., predicting a value of the flow rate in equation (8) to determine the predicted value of the water level in the wellbore 102. For the value of initial water level determined using traditional values, only the percentage of head derated (%) deh(t), and the percentage of flow rate derated (%) def(t) may be modified by the iterative solver.

The computing unit 304, with the calibration module 412, may be configured to calculate an error with an error equation. The error equation may be formulated with the predicted water level and the modified depth-to-water moD(t), and represented below:

$$\% \ \text{error} = \frac{|(\text{predicted value of water level}) - (moD(t))|}{moD(t)} \quad (9)$$

The computing unit 304, with the calibration module 412, may be configured to optimize values of the variables. Particularly, with the iterative solver, the computing unit 304 may be configured to determine a combination of the variables to reduce the error between the predicted water level and the modified depth-to-water moD(t). In other words, the computing unit 304 may use the iteration solver to determine a combination of the initial water level, the percentage of head derated (%) deh(t), and the percentage of flow rate derated (%) def(t) to modify the predicted water level and the modified depth-to-water moD(t) such that the % error may result about 0-1%. Such values of the variables are stored in the databases 310, and may be re-used in equation (7) to calculate calibrated depth-to-water.

Figure 14:
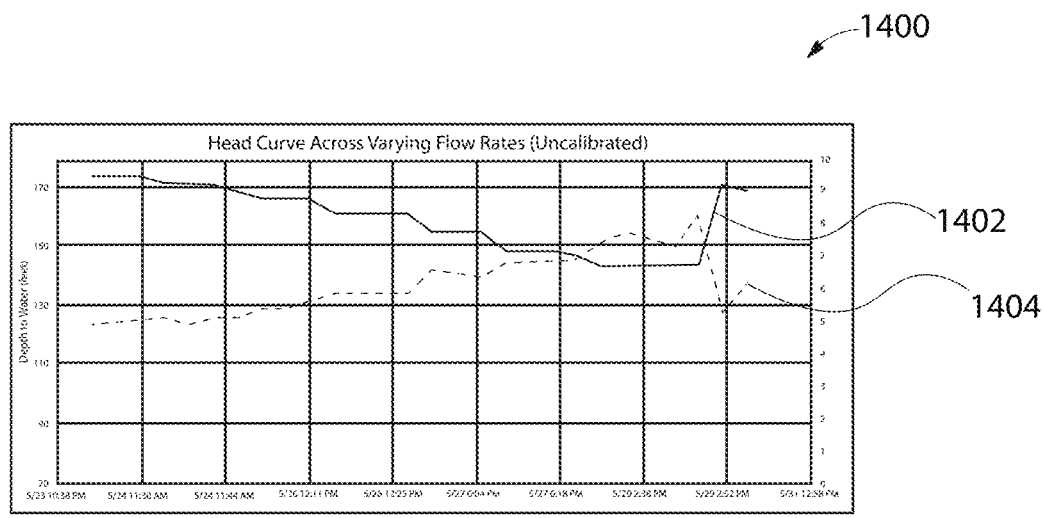
FIG. 14 illustrates a graphical representation of the depth-to-water with time.

FIG. 14 illustrates a graphical representation 1400 of the depth-to-water and time. In an exemplary configuration, the graphical representation 1400 illustrates a first curve 1402 depicting a flow rate, and a second curve 1404 depicting an uncalibrated depth-to-water for the wellbore 102. As seen in FIG. 14, the second curve 1404 may depict deviation, i.e., the slope of the second curve 1404 may vary with multiple oscillations over the predefined time period, for given constant slope of the first curve 1402. As such, when such deviation exceeds a deviation threshold range of about ±10%, an anomaly in the determination of the depth-to-water for the wellbore 102 may be detected. Therefore, the depth-to-water estimated may be inconsistent with the nature of the curve 1402, as well as the actual depth (when measured manually). As explained earlier, such deviation may occur due to head and flow rate derating caused by the pumping unit 104.

Therefore, to prevent the occurrence of deviation in the depth-to-water demonstrated by the second curve 1404, the calibration routine explained in FIG. 13 may be implemented. Accordingly, as a result of the calibration routine, the deviation of the second curve 1404 may be reduced to within the threshold range of about ±1%. This is explained in FIG. 15.

Figure 15:
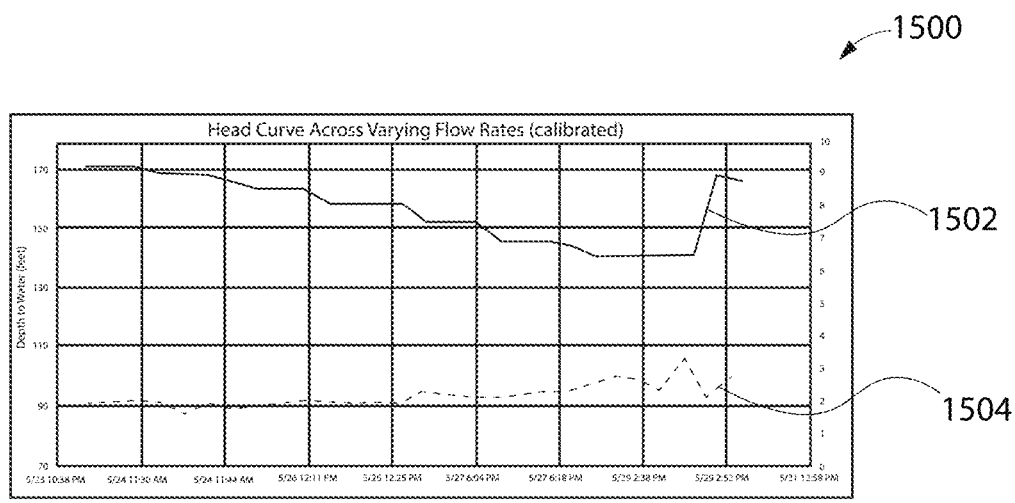
FIG. 15 illustrates a graphical representation of the calibrated depth-to-water and time.

FIG. 15 illustrates a graphical representation 1500 of the calibrated depth-to-water and time. The graphical representation 1500 may include a first calibrated curve 1502 and a second calibrated curve 1504. Similar to the graphical representation 1400, the first calibrated curve 1502 may depict the flow rate identical to the curve 1402, and the second calibrated curve 1504 may depict a calibrated depth-to-water.

As seen in FIG. 15, the second calibrated curve 1504 depicts the actual calibrated depth-to-water D(t) which may be calculated using equations (1)-(9) explained above. Accordingly, the calibrated depth-to-water calculated after implementation of the calibration routine exhibits a reduction in deviation. As seen in FIG. 15, the slope of the second calibrated curve 1504 may appear near-to-constant as compared to the varying slope of the second curve 1402 (seen in FIG. 14). Hence, as a result, the depth-to-water obtained from the calculation post-calibration appears to the consistent with the nature of the curve 1502, as well as the actual depth (when measured manually).

The computing unit 304 may be configured to determine a refined water-level parameter, such as a calibrated depth-to-water, the health of the wellbore 102, the equipment failures of the pumping unit 104, the fluid connection line 106, the sensor unit 108, and various real-time parameters using the modules depicted in FIG. 4. Further, the calibrated depth-to-water, the health of the wellbore 102, the equipment failures of the pumping unit 104, the fluid connection line 106, the sensor unit 108 may be transmitted to an end-user, or preferably, to the external devices 312 via the communication network 314.

The external devices 312 may be embedded with a software-based application. The software-based application may be configured to receive and display the calibrated depth-to-water, the health of the wellbore 102, the equipment failures of the pumping unit 104, the fluid connection line 106, and the sensor unit 108, using a user interface. The user interface is explained in conjunction with FIG. 16.

Figure 16:
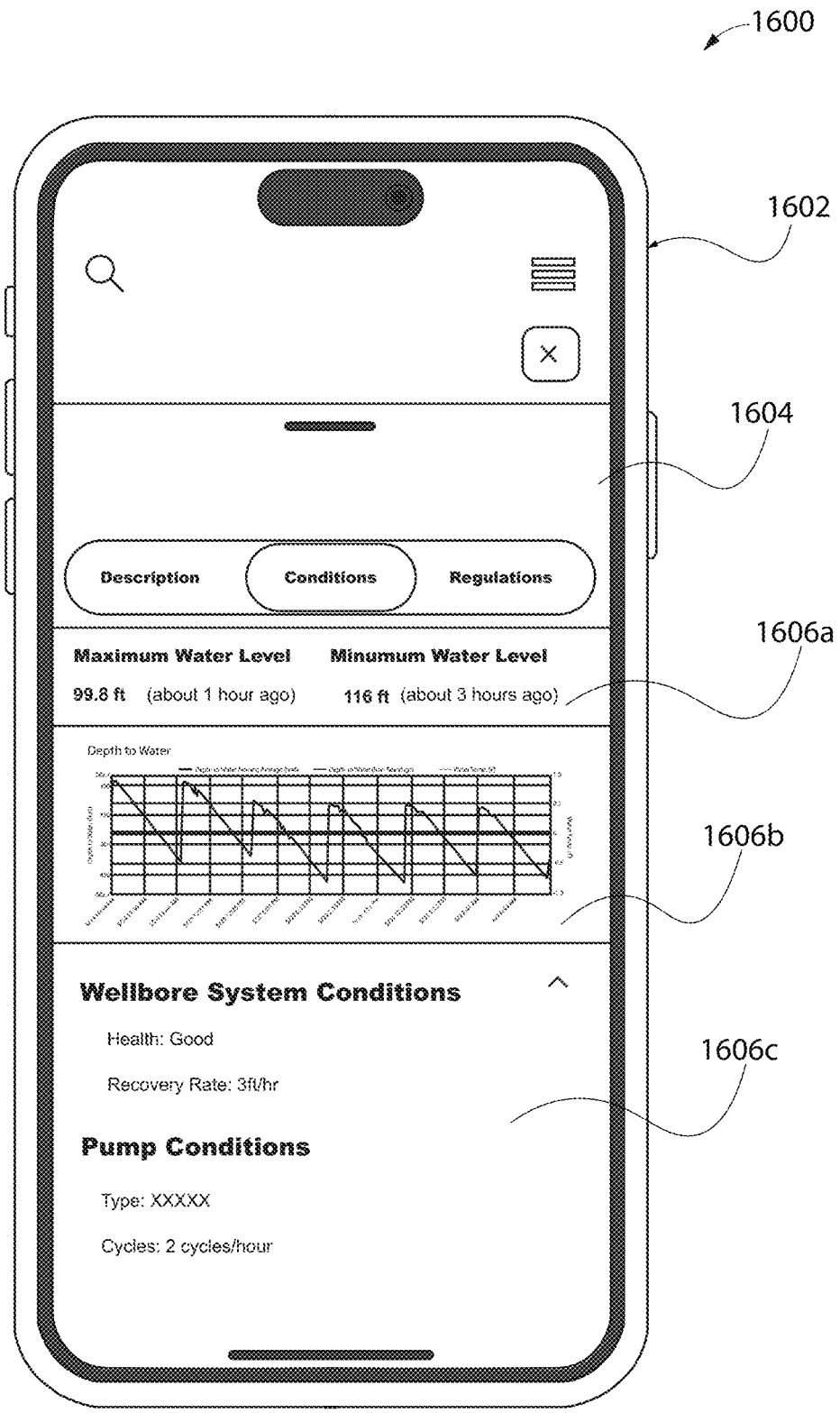
FIG. 16 illustrates a schematic view of a user device.

FIG. 16 illustrates a schematic view 1600 of a user device 1602. The user device 1602 may be included in the external devices 312 and may include but are not limited to, smartphones, tablets, computers, or any other electronic equipment capable of communication and interaction. Further, the user device 1602 may be embedded with a user interface 1604. The user interface 1604 may be configured to display the calibrated depth-to-water, the health of the wellbore 102, the equipment failures of the pumping unit 104, the fluid connection line 106, and the sensor unit 108. The user interface 1604 may include a first region 1606a, a second region 1606b, and a third region 1606c. It must be noted that the user interface 1604 may include additional display regions in addition to the first region 1606a, the second region 1606b, and the third region 1606c.

The first region 1606a may be configured to display various depth-to-water for various time periods throughout the day. For example, the first region 1606a may be configured to display the time at which the depth-to-water may be minimum, or in other words, the water level in the wellbore 102 is maximum. Moreover, the first region 1606a may be configured to display the time at which the depth-to-water may be maximum, or in other words, the water level in the wellbore 102 being minimum. The second region 1606b may be separated from the first region 1606a and may be configured to display the set of real-time parameters. As explained earlier, the set of real-time parameters may include temperature, pressure, and flow rate corresponding to the water flowing through the wellbore 102. Additionally, the second region 1606b may be configured to display wellbore parameters such as the recovery rate, maximum drawdown, and the water consumption rate of the wellbore 102. Further, the third region 1606c may be configured to display parameters related to the pumping unit 104. The parameters related to the pumping unit 104 may include historical data of the pumping unit 104, such as at least one diagnostic data of the pumping unit 104, start/stop pressure, a pump cycle data (total cycles occurring over a predefined time period), total pump failure over a predefined time, and the like. The aforementioned parameters may also be plotted in a single graph and displayed in anyone of the first region 1606a, the second region 1606b, and the third region 1606c.

The first region 1606a, the second region 1606b, and the third region 1606c may be customized based on the requirements of the user. For example, to view equipment failure data (such as leaks in the fluid connection line 106, failure of the pumping unit 104), any one of the first region 1606a, the second region 1606b, and the third region 1606c may be customized to display the equipment failure data. The first region 1606a, the second region 1606b, and the third region 1606c may be customized by modifying visual attributes such as color schemes, fonts, borders, and animations. Moreover, the layout of the first region 1606a, the second region 1606b, and the third region 1606c may be modified to display additional parameters such as the rate of leakage in the fluid connection line 106, or static water levels in the wellbore 102.

Figure 17:
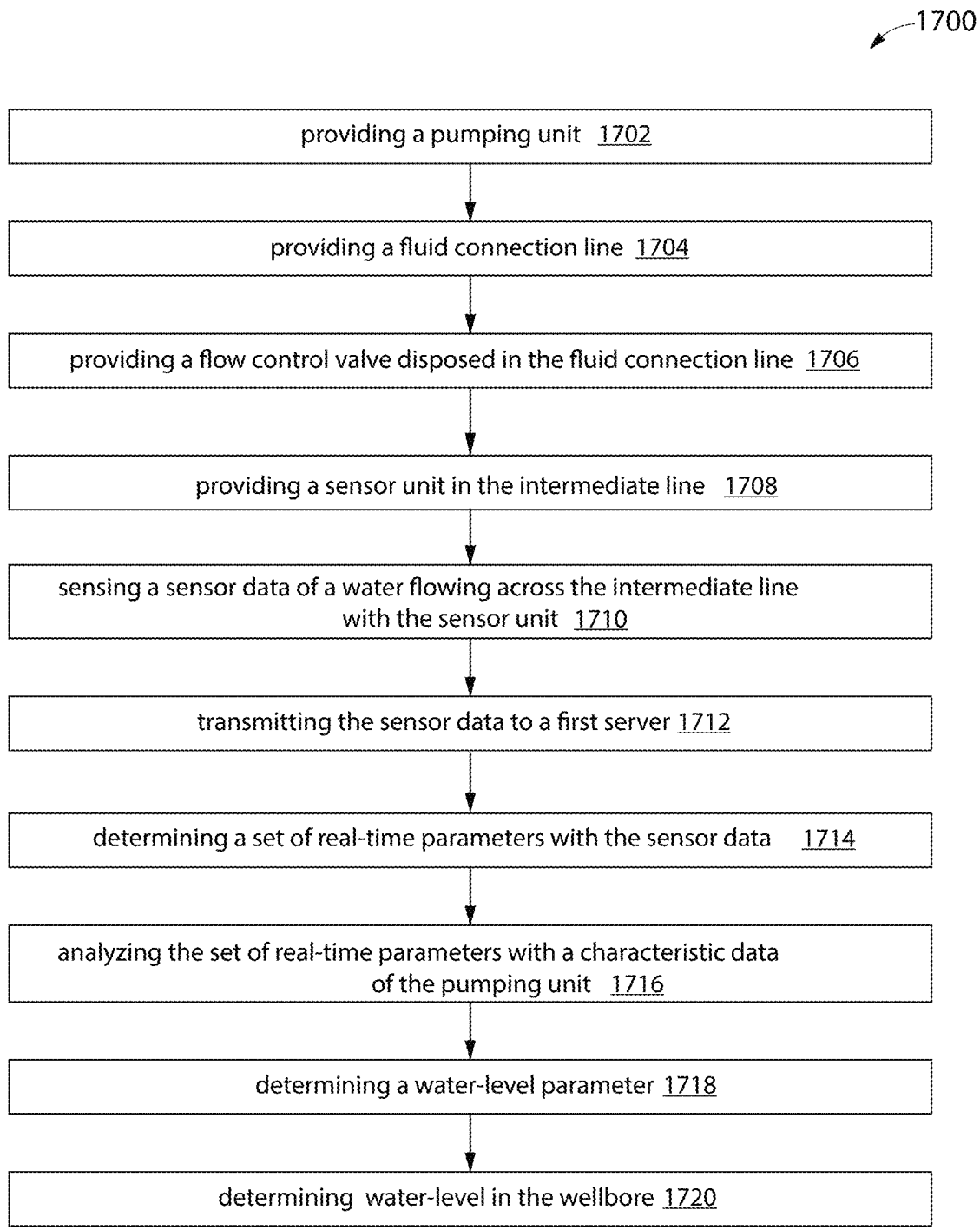
FIG. 17 illustrates a flowchart of a water level determination method.

FIG. 17 illustrates a flowchart 1700 of a water level determination method. The water level determination method may include one or more steps for processing inputs in the form of sensor data of the flowing water, with a characteristic data of the pumping unit 104 for determining the water level of the wellbore 102.

At step 1702, a pumping unit 104 may be provided. The pumping unit 104 may include submersible pumps such as but not limited to deep well pumps, borehole submersible pumps, stainless steel submersible pumps, oil-filled pumps, or above-surface pumps such as jet pumps, submersible or ground-based VFD pumps, and the like. The pumping unit 104 may be positioned at a predefined depth within the wellbore 102. Particularly, the predefined depth may include a depth at which water may be available.

At step 1704, a fluid connection line 106 may be provided. Further, the fluid connection line 106 may include an inlet fluidically coupled to the pumping unit 104, an outlet fluidically coupled to a water infrastructure, and an intermediate line disposed between the inlet and the outlet. The pumping unit 104 may be configured to draw and pump the water to the pressure tank 110 via the fluid connection line 106.

At step 1706, a flow control valve 208 may be provided. The flow control valve 208 may be disposed in the fluid connection line 106. Furthermore, the flow control valve 208 may include, but is not limited to ball valves, gate valves, butterfly valves, and the like. The flow control valve 208, when actuated, may be actuated to manipulate the flow of the water within the fluid connection line 106.

At step 1708, a sensor unit 108 may be provided in the intermediate line. The sensor unit 108 may include a pressure sensor 202, a temperature sensor 204, and a flow rate sensor 206. Further, the pressure sensor 202 and the flow rate sensor 206 may be configured to accommodate the flow control valve 208 therebetween. At step 1710, a sensor data of water flowing across the intermediate line of the fluid connection line 106 may be sensed with the sensor unit 108. The sensor data may include a pressure, a flow rate, and a temperature of the water flowing across the fluid connection line 106, which may be sensed with the pressure sensor 202, the temperature sensor 204, and the flow rate sensor 206, respectively.

At step 1712, the sensor data may be transmitted to at least one server. The pressure sensor 202, the temperature sensor 204, and the flow rate sensor 206 may be capable of communicating through an Internet-of-Things (IoT) architecture and may be configured to transmit the sensor data to the at least one server. The at least one server may be implemented as a database such as, for example, a server database, a cloud database, and the like.

At step 1714, a set of real-time parameters may be determined with the sensor data. Particularly, the at least one server may be communicably coupled to a computing unit 304, which may be embedded with various modules, such as include a sensor data module 402, a parameter determination module 404, a characteristic data module 406, a water-level determination module 408, a wellbore system health determination module 410, and a calibration module 412, to transform the sensor data to the set of real-time parameters. For example, the computing unit 304 may be configured to transform the sensor data to the set of real-time parameters with the parameter determination module 404.

At step 1716, the set of real-time parameters may be analyzed with a characteristic data of the pumping unit 104, which may be stored in the databases 310. The computing unit 304 may be configured to analyze the set of real-time parameters with a common curve 902 generated by analysis of one or more lookup tables of the characteristic data, to determine a total head generated by the pumping unit 104 corresponding to the flow rate.

At step 1718, a water level parameter may be determined by analyzing the set of real-time parameters with the characteristic data of the pumping unit. As explained earlier, the total head determined may be acquired by the computing unit 304 and may be configured to calculate the water level parameter. The water level parameter herein may include a depth-to-water in the wellbore 102 or a depth in the wellbore 102 at which the water may be available. At step 1720, the water level may be determined with the water level parameter. The water level may be calculated by calculating the difference between the depth-to-water, and the overall depth of the wellbore 102.

Figure 18:
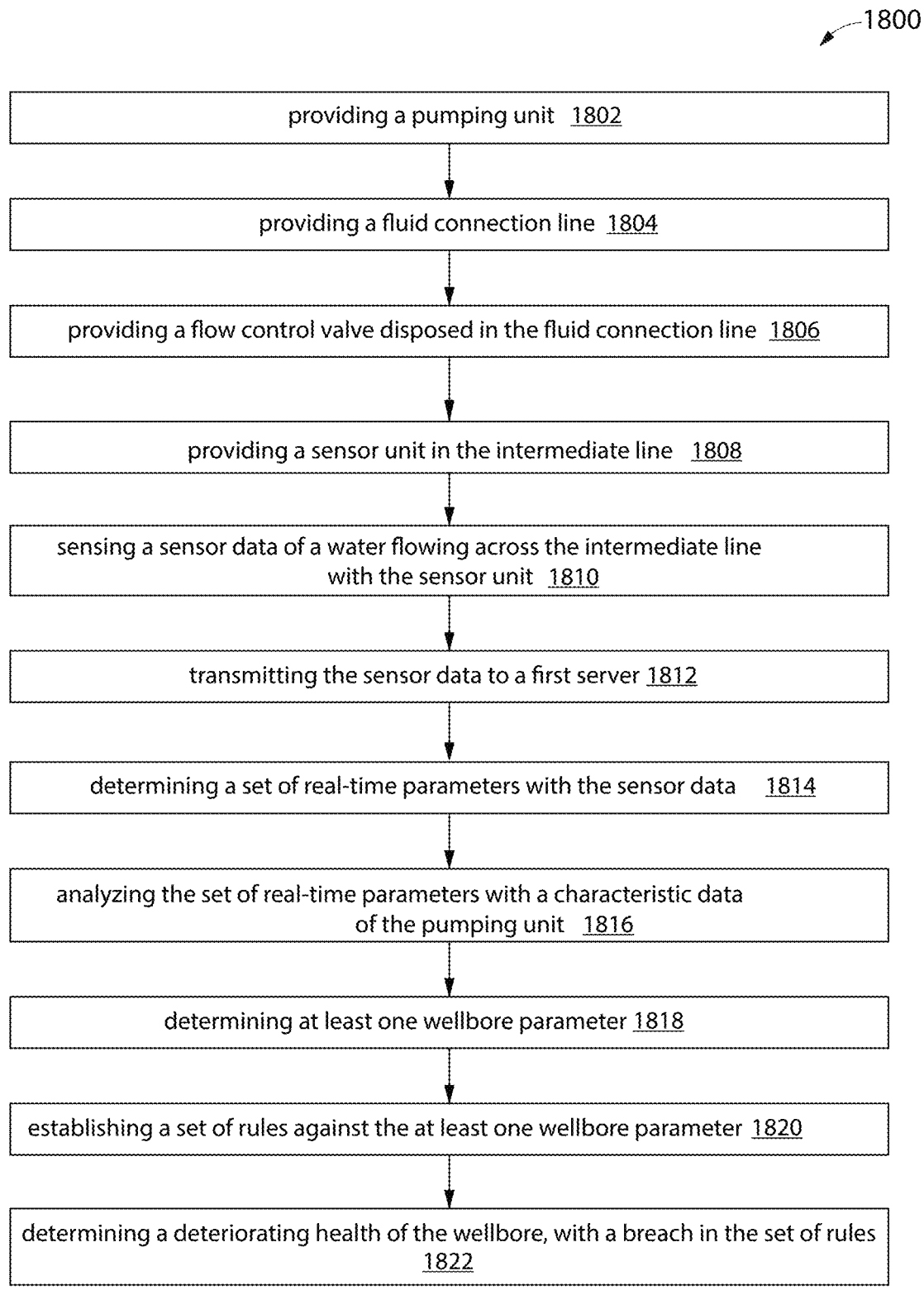
FIG. 18 illustrates a flowchart of a wellbore health determination method.

FIG. 18 illustrates a flowchart 1800 of a wellbore system health determination method. The wellbore system health determination method may include one or more steps for processing inputs in the form of sensor data of the flowing water, with a characteristic data of the wellbore 102, the pumping unit 104, and the fluid connection line 106 for determining a wellbore parameter of the wellbore 102. The wellbore parameter may be subjected to a set of rules, and an anomaly may be identified based on a breach in the set of rules. The anomaly may be identified as deteriorating health of the wellbore system 100. This is explained hereinafter.

At step 1802, a pumping unit 104 may be provided. The pumping unit 104 may include submersible pumps such as but are not limited to deep well pumps, borehole submersible pumps, stainless steel submersible pumps, oil-filled pumps, or above-surface pumps such as jet pumps, submersible or ground-based VFD pumps, and the like. The pumping unit 104 may be positioned at a predefined depth within the wellbore 102. Particularly, the predefined depth may include a depth at which water may be available.

At step 1804, a fluid connection line 106 may be provided. Further, the fluid connection line 106 may include an inlet fluidically coupled to the pumping unit 104, an outlet fluidically coupled to a water infrastructure, and an intermediate line disposed between the inlet and the outlet. The pumping unit 104 may be configured to draw and pump the water to the pressure tank 110 via the fluid connection line 106.

At step 1806, a flow control valve 208 may be provided. The flow control valve 208 may be disposed in the fluid connection line 106. Furthermore, the flow control valve 208 may include, but not limited to ball valves, gate valves, butterfly valve, and the like. The flow control valve 208, when actuated, may be actuated to manipulate flow of the water within the fluid connection line 106.

At step 1808, a sensor unit 108 may be provided in the intermediate line. The sensor unit 108 may include a pressure sensor 202, a temperature sensor 204, and a flow rate sensor 206. Further, the pressure sensor 202, and the flow rate sensor 206 may be configured to accommodate the flow control valve 208 therebetween. At step 1810, a sensor data of a water flowing across the intermediate line of the fluid connection line 106 may be sensed with the sensor unit 108. The sensor data may include a pressure, a flow rate, and a temperature of the water flowing across the fluid connection line 106, which may be sensed with the pressure sensor 202, the temperature sensor 204, and the flow rate sensor 206, respectively.

At step 1812, the sensor data may be transmitted to at least one server. The pressure sensor 202, the temperature sensor 204, and the flow rate sensor 206 may be capable of communicating through an Internet-of-Things (IoT) architecture and may be configured to transmit the sensor data to the at least one server. The at least one server may be implemented as a database such as, for example, a server database, a cloud database, and the like.

At step 1814, a set of real-time parameters may be determined with the sensor data. Particularly, the at least one server may be communicably coupled to a computing unit 304, which may be embedded with various modules, such as include a sensor data module 402, a parameter determination module 404, a characteristic data module 406, a water-level determination module 408, a wellbore system health determination module 410, and a calibration module 412, to transform the sensor data to the set of real-time parameters. For example, the computing unit 304 may be configured to transform the sensor data to the set of real-time parameters with the parameter determination module 404.

At step 1816, the set of real-time parameters may be analyzed with a characteristic data of the wellbore 102, the pumping unit 104, and the fluid connection line 106 which may be stored in the databases 310. The computing unit 304 may be configured to analyze the set of real-time parameters with a common curve 902 generated by analysis of one or more look-up tables of the characteristic data, to determine a total head generated by the pumping unit 104 corresponding to the flow rate.

At step 1818, a wellbore parameter may be determined by the computing unit 304 by analyzing the set of real-time parameters with the characteristic data of the pumping unit. The wellbore parameter may include a pressure tank failure rate, a pumping unit failure rate, a rapid cycling rate of the pumping unit, a rate of leakage of water from the fluid connection line, a static water level, and a recovery rate of water level.

At step 1820, a set of rules may be established by the computing unit 304. The set of rules may include elementary conditions. The set of rules may include elementary conditions, such as a difference in temperature of the water, a rate of decrease in pressure, a rate of decrease in flow rate, or the recovery rate of the water in the wellbore 102, a pressure tank failure rate, a pumping unit failure rate, rapid cycling rate of the pumping unit, rate of leakage of water from the fluid connection line, and a static water level, should not fall below a predefined threshold.

At step 1822, a deteriorating health of the wellbore system 100 may be determined, in case of a breach in the set of rules. The computing unit 304, with the wellbore system health determination module 410, may be configured to identify a breach in the set of rules, such as wellbore parameters falling below the predefined threshold, and such a condition may be flagged as a breach of the set of rules. The breach in the set of rules may identify a compromised state or a deteriorating health of the wellbore system 100.

In an exemplary configuration, a recovery rate prediction method for a wellbore is disclosed. The method may be explained by a graphical representation illustrating the depth-to-water and real-time parameters collected over a predefined period. The curve in the graphical representation represents prediction trends of the depth-to-water associated with various pumping cycles of the pumping unit. These prediction trends are determined based on the recovery rate, which is estimated by calculating the difference in the depth-to-water over a specified time period. The computing unit 304 utilizes this recovery rate to predict future recovery rates for each cycle of the pumping unit 104. These predicted recovery rates are plotted to form the graphical representation, which asymptotically approaches the depth-to-water on the y-axis.

In an exemplary configuration, the calibration module may be configured to calibrate the characteristic data with the derating of the head and the flow rate, i.e., determine a head with the derated flow rate to obtain a calibrated characteristic data. For example, the derated head may be determined by a multiplication of the ((%) deh(t)) with the head of the pumping unit 104. Similarly, the derated flow rate may be computed based on multiplication of the (%) def(t) with the flow rate of the pumping unit 104. The head, and flow rate herein may be acquired from the characteristics data of the pumping unit 104. The calibrated characteristic data may be utilized by the computing unit 304 to determine a modified depth-to-water.

In an exemplary configuration, the calibrated characteristic data 802 may be utilized by the computing unit 304 to calculate the calibrated depth-to-water. The computing unit 304, with the calibration module 412 may be configured to execute an iterative estimation with an iterative solver. The iterative estimation may include determining a combination of variables to reduce an error equation. The variable may be selected from an initial water level, predicted water level in the wellbore 102, the percentage of head derated (%) deh(t), and the percentage of flow rate derated (%) def(t). The static water level may be determined from an initial water level in the wellbore 102 determined using the depth-to-water as described in preceding configurations, or by using traditional methods explained earlier. It must be noted that the value of the predicted water level may be modified to determine a predicted value of the water level in the wellbore 102. The modification may be implemented based on increasing the measured flow rate (v) corresponding to a predicted value, i.e., predicting a value of the flow rate in equation (6) to determine the predicted value of the water level in the wellbore 102. The computing unit 304, with the calibration module 412, may be configured to calculate an error with an error equation. The computing unit 304, with the calibration module 412, may be configured to optimize values of the variables. Particularly, with the iterative solver, the computing unit 304 may be configured to determine a combination of the variables to reduce the error between the predicted water level and the modified depth-to-water moD (t). In other words, the computing unit 304 may use the iteration solver to determine a combination of the initial water level (when calculated based on D(t)), the percentage of head derated (%) deh(t), and the percentage of flow rate derated (%) def(t) to modify the predicted water level and the modified depth-to-water moD(t) such that the % error may result about 0-1%.

The methods, systems, devices, graphs, and/or tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of +20% or +10%, +5%, or +0.1% from the specified value, as such variations are appropriate to in the context of the systems, devices, circuits, methods, and other implementations described herein. "Substantially" as used herein when referring to a measurable value such as an amount, a temporal duration, a physical characteristic vectors (such as frequency), and the like, also encompasses variations of +20% or +10%, +5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and/or machine-readable media have been described in detail herein, it is to be understood that the inventive concepts may be otherwise variously embodied and employed and that the appended claims are intended to be construed to include such variations, except as limited by the prior art. While the principles of the disclosure have been described above in connection with specific apparatuses and methods, it is to be clearly understood that this description is made only by way of example and not as a limitation on the scope of the disclosure.

What is claimed is:

1. A water level determination method for determining a water level in a wellbore, the water level determination method comprising:
   providing a pumping unit;
   providing a fluid connection line, the fluid connection line comprising:
      an inlet fluidically coupled to the pumping unit;
      an outlet fluidically coupled to a water infrastructure; and
      an intermediate line disposed between the inlet and the outlet;
   providing a sensor unit in the intermediate line;
   sensing a sensor data of a water flowing across the intermediate line with the sensor unit, the sensor data comprising:
      a pressure,
      a flow rate, and
      a temperature;
   transmitting the sensor data to a first server;
   determining a set of real-time parameters corresponding to the sensor data;
   analyzing the set of real-time parameters with:
      a characteristic data of the pumping unit, the wellbore, and the fluid connection line, wherein the characteristic data is stored in the first server;
   determining a water level parameter by analyzing the characteristic data and the set of real-time parameters; and
   determining the water level based on the water level parameter.

2. The water level determination method of claim 1, wherein providing the sensor unit further comprises:
   a pressure sensor;
   a flow rate sensor; and
   a temperature sensor.

3. The water level determination method of claim 2, wherein providing the sensor unit further comprises:
   providing a flow control valve disposed in the fluid connection line; and
   positioning the pressure sensor prior to the flow control valve.

4. The water level determination method of claim 1 and further comprising:
   providing a calibration routine; and
   calibrating the characteristic data with the calibration routine, wherein the calibration routine comprises:
      actuating the flow control valve for modifying the sensor data to a refined sensor data; and
      calibrating the characteristic data with the refined sensor data to generate a calibrated characteristic data.

5. The water level determination method of claim 4, wherein actuating the flow control valve further comprises:
   actuating gradually, the flow control valve between:
      a first position to obtain the refined sensor data comprising:
         a maximum value of the sensor data;
      a second position to obtain the refined sensor data comprising:
         a minimum value of the sensor data; and
      at least one position between the first position and the second position to obtain a plurality of values sensor data between the maximum value of the sensor data and the minimum value of the sensor data.

6. The water level determination method of claim 5, wherein actuating the flow control valve further comprises:
   the maximum value of the sensor data comprising:
      a maximum rating pressure of the pumping unit; and
   the minimum value of the sensor data comprising:
      a minimum rating pressure of the pumping unit.

7. The water level determination method of claim 5, wherein the characteristic data and the calibrated characteristic data further comprises:
   a pump curve digitized into a multi-order polynomial.

8. The water level determination method of claim 4 and further comprising:
   analyzing the set of real-time parameters with the calibrated characteristic data for determining:
      a refined water-level parameter; and
   determining based on the refined water-level parameter, a refined water level of water in the wellbore.

9. A water level determination system to determine a water level in a wellbore, the water level determination system comprising:
   a pumping unit;
   a fluid connection line, the fluid connection line comprising:
      an inlet fluidically coupled to the pumping unit;
      an outlet fluidically coupled to a water infrastructure; and
      an intermediate line disposed between the inlet and the outlet;
   a sensor unit disposed in the intermediate line, the sensor unit configured to:
      sense a sensor data of a water flowing across the intermediate line with the sensor unit, the sensor data comprising:
         a pressure,
         a flow, and
         a temperature; and
      transmit the sensor data to a first server; and
   a computing unit communicably coupled to the first server, to:

determine a set of real-time parameters corresponding to the sensor data;

transmit the set of real-time parameters to a first server;

analyze the set of real-time parameters with:
- a characteristic data of the pumping unit, the wellbore, and the fluid connection line, wherein the characteristic data is stored in the first server;

determine a water level parameter by analyzing the characteristic data and the set of real-time parameters; and determine the water level based on the water level parameter.

10. The water level determination system of claim 9, wherein the sensor unit further comprises at least one of:
- a pressure sensor;
- a flow rate sensor; and
- a temperature sensor.

11. The water level determination system of claim 10 and further comprising:
- a flow control valve disposed in the fluid connection line, wherein the pressure sensor is positioned prior to the flow control valve.

12. The water level determination system of claim 9, wherein the pumping unit is calibrated using a calibration routine, wherein, in the calibration routine:
- the flow control valve is actuated to modify the sensor data to a refined sensor data; and
- the characteristic data is calibrated with the refined sensor data to generate a calibrated characteristic data.

13. The water level determination system of claim 12, wherein the flow control valve is gradually actuated between:
- a first position to obtain the refined sensor data comprising:
  - a maximum value of the sensor data;
- a second position to obtain the refined sensor data comprising:
  - a minimum value of the sensor data; and
- at least one position between the first position and the second position to obtain a plurality of values sensor data between the maximum value of the sensor data and the minimum value of the sensor data.

14. The water level determination system of claim 13, wherein:
- the maximum value of the sensor data comprises:
  - a maximum rating pressure of the pumping unit; and
- the minimum value of the sensor data comprises:
  - a minimum rating pressure of the pumping unit.

15. The water level determination system of claim 12, wherein the characteristic data and the calibrated characteristic data further comprises:
- a pump curve digitized into a multi-order polynomial.

16. The water level determination system of claim 12, wherein the logic unit is configured to:
- analyze the set of real-time parameters with the calibrated characteristic data to determine:
  - a refined water-level parameter; and
- determining based on the refined water-level parameter, a refined water level of water in the well.

\* \* \* \* \*